United States Patent
Birk et al.

(10) Patent No.: US 10,521,339 B2
(45) Date of Patent: Dec. 31, 2019

(54) RETIRED PAGE UTILIZATION (RPU) FOR IMPROVED WRITE CAPACITY OF SOLID STATE DRIVES

(71) Applicant: Technion Research and Development Foundation LTD., Haifa (IL)

(72) Inventors: Yitzhak Birk, Hod Hasharon (IL); Amit Berman, Nahariya (IL)

(73) Assignee: Technion Research and Development Foundation LTD., Haifa (IL)

(*) Notice: Subject to any disclaimer, the term of this patent is extended or adjusted under 35 U.S.C. 154(b) by 370 days.

(21) Appl. No.: 14/191,471

(22) Filed: Feb. 27, 2014

(65) Prior Publication Data
US 2014/0244912 A1    Aug. 28, 2014

Related U.S. Application Data

(60) Provisional application No. 61/770,354, filed on Feb. 28, 2013.

(51) Int. Cl.
G06F 12/02 (2006.01)

(52) U.S. Cl.
CPC .. G06F 12/0246 (2013.01); *G06F 2212/7205* (2013.01); *G06F 2212/7207* (2013.01)

(58) Field of Classification Search
None
See application file for complete search history.

(56) References Cited

U.S. PATENT DOCUMENTS

| | | | |
|---|---|---|---|
| 2006/0120164 A1* | 6/2006 | Ishii | G11C 16/0491 365/185.24 |
| 2010/0064096 A1* | 3/2010 | Weingarten et al. | 711/103 |
| 2012/0173827 A1* | 7/2012 | Wood | G11C 11/5621 711/154 |
| 2014/0059406 A1* | 2/2014 | Hyun | G11C 11/5621 714/773 |
| 2014/0347936 A1* | 11/2014 | Ghaly | 365/185.18 |

* cited by examiner

Primary Examiner — Edward J Dudek, Jr.
Assistant Examiner — Ryan Dare
(74) Attorney, Agent, or Firm — Reches Patents

(57) ABSTRACT

A method for writing data to a memory module, the method may include determining to write a representation of a data unit to a retired group of memory cells; searching for a selected retired group of memory cells that can store a representation of the data unit without being erased; and writing the representation of the data unit to the selected retired group of memory cells.

21 Claims, 21 Drawing Sheets

800

| Parameter | Value |
|---|---|
| SSD size [pages] | 1K, 10K |
| RPP size | 10% of SSD size |
| Page size [bytes] | 2kB |
| Erase block size [pages] | 64 |
| Page comparison limit | 18 |
| Erasures per block | 10, 100 |
| Piece-wise Linear WOM | (k,n)=(3,7),(4,15),(5,31) |

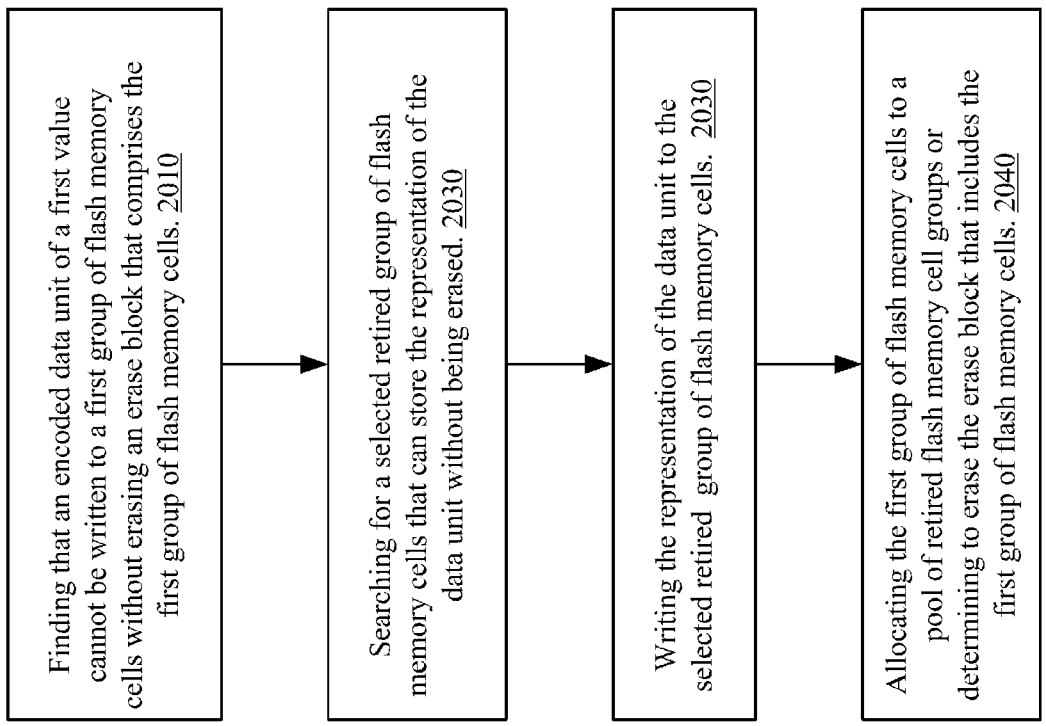

RETIRED PAGE UTILIZATION (RPU) FOR IMPROVED WRITE CAPACITY OF SOLID STATE DRIVES

BACKGROUND OF THE INVENTION

NAND Flash is presently a prominent solid-state memory non volatile technology, and the use of solid-state drives (SSD) is expanding.

In Flash, the charge level of a cell can only be raised. As long as one makes changes to the data of a given page such that the level of any cell either remains unchanged or is raised, in-place updates are possible. Once the desired data cannot be written to its page, the page is retired for subsequent erasure and reuse, and the data is written elsewhere. Erasure can only be carried out in bulk (multi-page blocks). Moreover, the number of erasure cycles (endurance) is limited.

While SSD offer higher performance and other advantages over mechanical magnetic hard disk drives (HDD), their per-bit cost is still much higher [1, 2, 3], making cost reduction important.

The state of the art may be provide din the following references:

[1] J. Cooke, "Flash memory technology direction", In Proceedings of the Windows Hardware Engineering Conference (WinHEC), 2007.
[2] J. Brewer et-al., "Nonvolatile Memory Technologies with Emphasis on Flash", IEEE Press Ser. on Microelec. Sys., Chap. 1, 2008.
[3] S. Rizvi, T. Chung, "Flash SSD vs. HDD: High performance oriented modern embedded and multimedia storage systems", ICCET, 2010.
[4] K. Prall, "Scaling non-volatile memory below 30 nm", In Non-Volatile Semiconductor Memory Workshop (NVSMW), pages 5-10, 2007
[5] C. Trinhlet-al, "13.6 A 5.6 MB/s 64 Gb 4 b/Cell NAND Flash Memory in 43 nm CMOS", in IEEE International Solid-State Circuits Conference (ISSCC) 2009.
[6] Samsung Electronics, "K9NBG08U5M 4 Gb*8 Bit NAND Flash Memory Data Sheet".
[7] Samsung Electronics, "K9GAG08U0M 2 Gb*8 Bit NAND Flash Memory Data Sheet".
[8] Laura M. Grupp et-al., "The Bleak Future of NAND Flash Memory", Proceedings of the 10th USENIX conference on file and storage technologies, 2012.
[9] Laura M. Grupp, Adrian M. Caulfield, Joel Coburn, Steven Swanson, "Characterizing Flash Memory: Anomalies, Observations, and Applications", Micro'09.
[10] R. L. Rivest and A. Shamir, "How to reuse a write-once memory," Infor-mation and Control, vol. 55, pp. 1-19, December 1982.
[11] J. K. Wolf, A. D. Wyner, J. Ziv, and J. Korner, "Coding for a write-once memory," AT&T Bell Labs. Tech. J., vol. 63, no. 6, pp. 1089-1112, 1984.
[12] S. Kayser, E. Yaakobi, P. H. Siegel, A. Vardy, and J. K. Wolf, "Multiplewrite WOM-codes," Proc. 48-th Annual Allerton Conference on Communication, Control and Computing, Monticello, Ill., September 2010.
[13] E. Yaakobi, S. Kayer, P. H. Siegel, A. Vardy and J. K. Wolf, "Codes for Write-Once Memories", to appear in IEEE Trans. on Information Theory.
[14] G. D. Cohen, P. Godlewski, and F. Merkx, "Linear binary code for write-once memories," IEEE Trans. IT, vol. 32(5), pp. 697-700, September 1986.
[15] A. Jiang and J. Bruck, "Joint coding for flash memory storage," Proc. IEEE Intrnl Symp. on Info. Theo., pp. 1741-1745, Toronto, July 2008.
[16] A. Jiang, "On The Generalization of Error-Correcting WOM Codes", IEEE International Symposium on Information Theory (ISIT), pp. 1391-1395, 2007.
[17] A. Jiang, V. Bohossian, and J. Bruck, "Floating codes for joint information storage in write asymmetric memories," in Proc. 2007 IEEE Int. Symp. Information Theory (ISIT2007), Nice, France, June 2007, pp. 1166-1170.
[18] A. Jiang, R. Mateescu, M. Schwartz and J. Bruck, "Rank Modulation for Flash Memories", IEEE Transactions on Information Theory, vol. 55, 2009.
[19] L.-P. Chang. On efficient wear leveling for large-scale flash memory storage systems. In SAC '07: Proceedings of the 2007 ACM symposium on Applied computing, 2007
[20] S. Lee, K. Ha, K. Zhang, J. Kim, and J. Kim, "FlexFS: A Flexible Flash File System for MLC NAND Flash Memory", Proceedings of the USENIX Annual Technical Conference, 2009.
[21] Y. Zhang, L. P. Arulraj, A. Arpaci-Dusseau, and R. ArpaciDusseau. "De-indirection for flash-based SSDs with nameless writes". In FAST, 2012.
[22] F. Chierichetti, H. Finucane, Z. Liu, and M. Mitzenmacher. "Designing floating codes for expected performance". IEEE Allerton, 2008.
[23] H. Kamabe, "Floating codes with good average performance", in Proc. IEEE International Symposium on Information Theory and its applications (ISITA) 2009.
[24] H. Finucane and M. Mizenmacher, "Worst-case and average-case floating codes for flash memory," Harvard University, 2009.
[25] R. Suzuki, T. Wadayama, "Layered Index-less Indexed Flash Codes for Improving Average Performance", in Proc. IEEE International Symposium on Information Theory (ISIT), 2011.
[26] A. Berman, Y. Birk, "Probabilistic Performance of Write-Once Memory with Linear WOM codes—Analysis and Insights", IEEE Allerton, 2012.
[27] Y. Wu, "Low Complexity Codes for Writing a Write-Once Memory". Proc. IEEE Info. Theo. Symp. (ISIT) 2010.
[28] Y. Cassuto, M. Schwartz, V. Bohossian, and J. Bruck, "Codes for multilevel flash memories: correcting asymmetric limited-magnitude errors", Proc. IEEE Info. Theo. Symp. (ISIT), 2007.

SUMMARY OF THE INVENTION

According to an embodiment of the invention, various methods may be provided and are described in the specification. According to various embodiments of the invention, there may be provided a non-transitory computer readable medium that may store instructions for performing any of the methods described in the specification and any steps thereof, including any combinations of same. Additional embodiments of the invention include a storage system arranged to execute any or all of the methods described in the specification above, including any stages—and any combinations of same.

According to an embodiment of the invention there may be provided a method that may include determining to write a representation of a data unit to a retired group of memory cells; searching for a selected retired group of memory cells that can store a representation of the data unit without being erased; and writing the representation of the data unit to the selected retired group of memory cells.

The determining may be preceded by finding that an encoded data unit of a first value cannot be written to a first group of memory cells without erasing an erase block that may include the first group of memory cells.

The determining may include determining whether to write the representation of the data unit to an erased group of memory cells or to the retired group of memory cells.

The method may include generating a representation of the data unit by applying an encoding scheme that allows representing a same value in different manners and considering at least one of the manners when evaluating a candidate group of cells.

The encoding scheme may be a write-once memory scheme.

The encoded data unit of the first value may be encoded by using an encoding scheme that is limited to representing a value by a single manner.

The determining may be preceded by finding that writing an encoded data unit of a first value to a first group of memory cells is more costly than writing the representation of the data unit to the selected group of memory cells.

The first group of memory cells may form a page of memory cells.

The selected retired group of memory cells may be a portion of a retired page of memory cells.

The method may include allocating the first group of memory cells to a pool of retired memory cell groups.

The method may include searching the selected retired group of memory cells out of multiple groups of memory cells of a pool of retired memory cells.

The multiple groups of memory cells may form a subset of the pool of the retired memory cells.

The multiple groups of memory cells may form a subset of the pool of the retired memory cells, wherein the subset is generated based upon a number of writable without erasure memory cells within each group of memory cells.

The method may include selecting the selected retired group of memory cells out of multiple groups of memory cells of the pool of retired memory cells in response to a number of writable without erasure memory cells per each group of memory cells.

The method may include selecting the selected group of memory cell out of groups of memory cell capable of storing the representation of the data unit without being erased as having a lowest number of writable without erasure memory cells.

The method may include selecting the selected group of memory cells to be of (a) a smallest number of memory cells that need to be written into out of the multiple groups of memory cells, and (b) is capable of storing the representation of the data unit without being erased.

The method may include selecting the selected group of memory cells in response to a program and erase cycle count of each of the multiple groups of memory cells.

The method may include selecting the selected group of memory cells as having a lowest number of program and erase cycle count of each of the multiple groups of memory cells.

The method may include selecting the selected group of memory cells based upon a number of memory cells that should be programmed, per each group of memory cells, for storing the representation of the data unit.

The method may include selecting the selected group of memory cells that requires a lowest number of memory cells to be programmed for storing the representation of the data unit.

The method may include selecting the selected group of memory cells in response to (a) a number of memory cells that should be programmed, per each group of memory cells, for storing the representation of the data unit, (b) number of writable without erasure memory cells of each of the multiple groups of memory cells, and (c) is capable of storing the representation of the data unit without being erased.

The method may include applying different selection policies to select the selected group of memory cells in response to a state of the multiple memory cells.

The method may include determining a manner of writing the representation to the selected group of memory cells in response to a fullness level of the selected group of memory cells.

The method may include selecting the selected group of retired memory cell in response to a state of an erase block that may include the group of retired cells.

The method may include selecting the selected group of retired cell in response to a relationship between retired and non-retired memory cell groups in an erase block that may include the selected group of retired memory cells.

The method may include storing information representative of a content of retired groups of memory cells in a cache memory.

The method may include storing information representative of a content of retired groups of memory cells in a memory unit that has a lower read period than the selected group of memory cells.

The selected retired memory cells may be flash memory cells.

The selected retired memory cells may be non-volatile memory cells.

The selected retired memory cells may be volatile memory cells.

The atomic unit for erasure may be an erase block.

The value stored within each memory cell may be changeable, by a write operation, only along a single direction.

There may be provided according to an embodiment of the invention a non-transitory computer readable medium that stores instructions for determining to write a representation of a data unit to a retired group of memory cells; searching for a selected retired group of memory cells that can store a representation of the data unit without being erased; and writing the representation of the data unit to the selected retired group of memory cells.

The non-transitory computer readable medium may store instructions for executing any of the method staged mentioned above and in any other location in the specification.

A system may include a memory controller that is arranged to determine to write a representation of a data unit to a retired group of memory cells; search for a selected retired group of memory cells that can store a representation of the data unit without being erased; and write the representation of the data unit to the selected retired group of memory cells.

The system may be arranged to execute any of the method staged mentioned above and in any other location in the specification.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 8 illustrates some parameter used during an analysis according to an embodiment of the invention;

FIG. 19 is a flow chart according to an embodiment of the invention.

Figure 1:
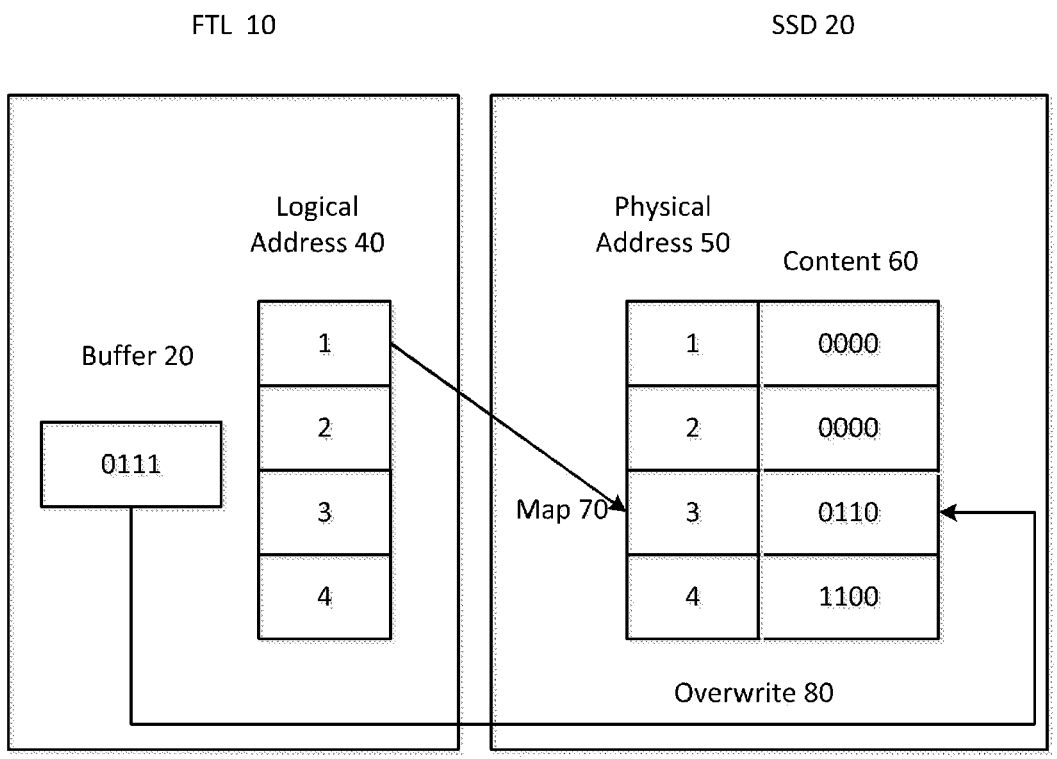
FIG. 1 illustrates an overwrite operation of a retired page according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

Because the illustrated embodiments of the present invention may, for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

The following explanation refers to flash memory cells. It is also applicable to other volatile or non-volatile memory cells, especially cells whose number of erasures is not unlimited, cells whose erasure is much slower or otherwise costly than writing to them, and cells of a non-volatile memory that are erased in erase blocks.

In the following text there are references to flash memory pages and to retired page utilization (RPU). It is noted that the invention is applicable mutatis mutandis to groups of flash memory cells that differ from pages.

Any reference in the text to a single bit per cell flash memory (and to possible values of "1" and "0" alone) should be interpreted as being applicable to a multiple bit per cell flash memory cells.

The term "retired group of flash memory cells" refers to a group of flash memory cells at least one of which was written at least once after the last erasure of these flash memory cells. A retired group of flash memory cells can store at least one bit of data that is deemed to be invalid. These group of flash memory cells may have been associated with a failed attempt to write that certain value or be associated with an determination (that did not include actual writing) that they are not capable of storing the certain value without being erased.

A determination to write to a retired group of flash memory cells can be responsive to the cost (in time, errors, lifespan of the cells, complexity or any other cost function). If, for example, writing 0 is more expensive than writing 1—one could use a different page so as to reduce the number of 0s being written. A retired group of flash memory cells can be used even if there is no failure or inability to write a certain value but also if there are other considerations, at least ones related to the cost and/or duration of writing, where cost could be related to the lifetime.

The retired group of flash memory cells may be a retired physical page. A retired page may be a non-blank page that held content and it was subsequently decided, be it by choice or by lack of an option, to write the (new content/value of the) data/information page that resided in it elsewhere. Instead of erasing this page—it may be defined as a retired page and new content may be written to it subject to a representation of said new content being writable to said retired page without requiring that it first be erased. A physical page may be regarded as being retired once the logical page that resided in it is deleted (content no longer of interest) or mapped to another physical page (either because new content cannot be written in place or because it is chosen to write it elsewhere or because it is decided to move the data page elsewhere, e.g., because the block containing the physical page needs to be erased in bulk or because, merely by example, it is decided that certain logical pages should reside in the same block of physical pages.

In write-once memory (e.g., Flash), a cell's level can only be raised. Erasure is only in bulk. The number of erasures that a cell can withstand (endurance) is limited, and drops sharply with technology shrinkage or additional charge levels. The normalized write capacity (total amount of data that can be written divided by storage capacity) drops similarly. Various coding schemes enable overwrites at the expense of capacity overhead. Whenever desired data cannot be written to its current page, the page is "retired" for erasure.

We observe that a retired page can still be used for writing other data, and present Retired Page Utilization (RPU): we keep a (typically) small pool of extra (retired or erased) pages; if a page cannot be written in place, but the data can be written in one of the pool pages, the old page joins the pool and the new one leaves it. We present several pool utilization policies. Simulation results show that RPU, when used in conjunction with existing data encoding schemes and a moderate number of extra pages, nearly doubles the write capacity relative to those schemes with very low access overhead. It is hereby pointed out that, for various reasons such as the fact that only entire blocks of cells can be erased and, if a block comprising solely pages that do not hold valid data cannot be found, valid data must be copied elsewhere before the said block can be erased, prior art schemes keep a significant number of blocks beyond the declared capacity. The pool of retired pages according to the current invention can thus optionally comprise already existing groups of cells that do not hold valid data with no need to add groups of cells solely in order to support the RPU scheme. The salient inventive step of RPU is that whereas in prior art a group of cells is retired upon first failure to write data to it, and no further attempts are made to write to it before it is erased, RPU does consider at least certain retired groups of cells for writing data. This data has a value that differs from the one whose writing was impossible and which caused the retirement of the said group of cells.

The SSD cost challenge is addressed mostly by aggressive device scaling and multi-level cell architectures [4, 5]. Unfortunately, those sharply reduce the endurance, thereby limiting product lifetime. For example, single-level cells (SLC) tolerate 100 k erasure cycles, whereas multi-level cells (MLC) only tolerate 10 k cycles [6, 7, 8 9]. The challenge is thus to jointly improve the cost-capacity ratio and endurance.

Endurance itself is a purely physical property, as are the number of cells and the number of levels per cell. However, the truly important measures from a system perspective are storage capacity and normalized write capacity, which we next define:

Definition 1: storage capacity is the amount of information that can be stored in a device at any given time. (This is the device's "published" storage capacity.)

Definition 2: normalized write capacity equals the total amount of information that can be written to a storage device during its useful lifetime, divided by the product of the device's raw storage capacity and its endurance. (The raw capacity of device with N cells, each with L levels is $N\log_2 L$). With coding, the storage capacity can be much lower than this raw capacity.

Techniques such as write-once memory (WOM) coding and over-provisioning serve to improve the normalized write capacity at the cost of storage capacity. WOM codes employ at least 50% additional capacity to achieve a twofold increase in the mean number of writes to a given page before it must be retired and erased [10, 11, 12, 13].

The key observation underlying the current invention is that a retired page is not truly useless: the page was retired because certain data couldn't be written in it, but other data may be writable in it.

FIG. 1 depicts an example of four pages (logical addresses 40 from 1 to 4, physical addresses 50 from 1 to 4), pages 1 and 2 are blank (content 60 is 0000) and pages 3 and 4 are retired (associated with failed write attempts and store content that is not blank—content 0110 and 1100). It can readily be appreciated that the new data, 0111 (stored in buffer 20), can be written (overwrite 80) into page 3, whose content is 0110, and there is no need to contaminate a blank page. With this in mind, we propose Retired-Page Utilization (RPU).

The basic RPU technique entails the use of a pool of extra pages (beyond the declared number of pages). Whenever a page must be retired, it becomes part of this pool. The data that couldn't be written into the retired page is written, if possible, into one of the pages in the pool, and that page is withdrawn from the pool. The size of this Retired Page Pool (RPP), initially comprising erased pages, thus remains constant.

Remark. Whenever the SSD is not full to capacity with data, and even when it is full but extra blocks of data exist, any unused capacity can be utilized as part of the RPP. As the RPP merely represents write-location choices, there is no concern that subsequent new data will not have room.

Whenever there are multiple RPP pages to which a given data page can be written, a page selection policy is used. Selection considerations may include issues such as ease of finding a suitable page and minimization of "page consumption" (e.g., number or total amount of level changes).

RPU (probabilistically) increases the number of writes to a physical page between erasures, thereby increasing the write capacity for any given physical endurance. Since the pool size can be relatively very small, the normalized write capacity also increases.

Very simple probabilistic analysis reveals that, especially if the number of retired pages considered for writing a given data page is kept moderate, the impact of RPU is significant if the probability of any given page being writable is not very low. We therefore advocate (but do not require) the use of RPU in conjunction with techniques that increase this probability. These include write once memory (WOM) codes and error correcting codes, both of which permit some flexibility in the content being written at the cost of some redundancy. It should be noted that RPU and those techniques are complementary: the other techniques offer some flexibility in the content (data representation) being written, whereas RPU offers flexibility in the choice of physical page (and its current content) to which it is written.

Dynamic page mapping mechanisms already exist in the flash translation layer (FTL) or elsewhere. It is necessitated by the fact that in-place updates are seldom possible, and erasure can only be applied to a block comprising a large number of contiguous physical pages (typically 64 or 128); it is also used for wear leveling. Incorporation of RPU thus entails mostly a change in policy and a small amount of additional metadata.

There may be provided an RPU. Mathematical analysis and simulations are included mainly in order to offer insights and to provide a feel for the benefits that can be gained. For random data as well as with a real storage workload, our results indicate that for 10K page SSD with 1K over-provisioning, RPU achieves more than doubles write capacity over the same coding alone. The realization of the "pain" in having to nearly always erase a page after each write to it has triggered extensive research into techniques that can mitigate this situation. Most notably, techniques that combine some intra-page over provisioning of storage space (redundancy) with one-to-many data mappings: the same information can be represented in more than one way, thereby offering a choice among several writing options in the hope that at least one is permissible given the current states of the target page's cells.

Write-once memory (WOM) codes, first suggested by Rivest and Shamir [10], paved the path for exploring efficient and high-rate WOM codes. Table 1 depicts an example of writing two bits twice into three cells: the encoding of the $1^{st}$ write is dictated by the corresponding column, whereas the $2^{nd}$ write may use either encoding. One can easily verify that following any $1^{st}$-write data, any 2-bit data can be written without a need to change a 1 to a 0. Normalized guaranteed write capacity is increased from 1 to 4/3.

TABLE 1

| DATA | FIRST WRITE | SECOND WRITE |
|------|-------------|--------------|
| 00   | 000         | 111          |
| 01   | 010         | 110          |
| 10   | 010         | 101          |
| 11   | 100         | 011          |

Various constructions of WOM codes have been proposed, along with encoding and decoding algorithms. Rivest and Shamir proposed tabular and linear WOM codes [10]. Cohen et-al. described a coset-coding technique [14]. Jiang et-al. suggested generalizations for a multi-level memory cell [15, 16]. Yaakobi et-al. proposed high-rate WOM codes [13]. These proposed WOM constructions focus on maximizing the code rate under the assumption that a codeword is exponentially larger than data size. It is shown [10] that in order to enable two guaranteed writes of a data block, at least 50% additional storage capacity is required.

As cell size shrinks, signal to noise ratio decreases and probability of error in a cell's level increases. Moreover, error rate increases with device use and when data is retained for long periods of time. Error-correction capability is a key to prolonging a product's useful lifetime. Therefore, practical WOM codes must be combined with error-correction mechanisms, and these are indeed commonly an integral part of Flash memory controllers.

In existing WOM schemes, occurrence of a data error can result in error propagation. This has led to the development of WOM coding schemes with error correcting capabilities. This further increases the required redundancy for a given number of guaranteed overwrites. In [16], highly efficient rate constructions are presented for error-correcting WOM, whereby single- and double-error correction capability roughly doubles the WOM block used and triples it, respectively.

Floating codes [17] are an important variation of WOM codes, whereby only one bit set is possible in each write. Since data is likely to change in more than one bit, WOM codes are more suitable for Flash storage. Other codes include rank modulation codes, which encode data as a permutation of the relative values [18].

In all the prior art schemes, data is either written in place with appropriate encoding or else the page is retired (for subsequent erasure without making any further consideration of writing (different) data to said page prior to its erasure) and the data is written to a blank (erased) page with the mapping table (FTL) updated accordingly.

Write capacity (absolute, not normalized) can also be increased by "external" over-provisioning [19], namely additional pages that are not declared to the host (user). Data pages are written to blank physical pages, with the mapping chosen so as to roughly equate the number of writes to all physical pages (wear leveling). In fact, "cold" data can be moved from little-used physical pages to "aging" ones.

File system approaches utilize the flexibility to write to MLC cell as SLC. FlexFS [20] dynamically allocates SLC and MLC memory regions according to application needs. In this approach, data reorganization and large over-provisioning may be required.

Common to all the above schemes is that overwrite attempts, if at all, are made only to a page's current location. Upon failure, only blank pages are considered. A page, once retired, is thus not used until erased. Our proposed approach offers the additional flexibility of considering retired pages for writing the desired data.

Retired Page Utilization (RPU)

We present RPU in some detail. For facility of exposition and in order to be concrete, we refer to a specific embodiment and page-selection policy, and describe the scheme as if it is executed at the flash translation layer (FTL). Neither of these, however, is a true restriction: any policy can easily be implemented, and the scheme can be also employed in conjunction with Nameless Writes [21]. We first describe RPU components and organization, and then detail its handling of host write requests.

RPU Architecture

RPU comprises the following main elements:

Page Pools and Mappings

The pools and mappings presented and defined below are one way of organizing information in support of RPU. It is obvious to anyone skilled in the art that there are various essentially equivalent organizations that achieve the same purpose. For example, the erased page pool and retired page pool can be unified, letting the page selection policy decide whether to consider a page holding invalid data for writing new information or to use an erased page.

Data page table (DPT). It contains a logical-to-physical page mapping for each allocated data page. It is initially empty, and may contain up to d entries, where d is the publicized total storage capacity. By abuse of notation, DPT refers both to the table and to the set of physical pages to which it points.

Physical page table (PPT). It contains, for each physical page, useful metadata such as whether the page is erased, the number of times that it has been erased (this can be maintained per block rather than per page), whether it is holding valid data (in which case it is pointed to by the DPT), some indicator for the type of data that it holds (e.g., "hot" or "cold"), indicators for the likelihood of possibility to write data to it (e.g., the number of '1's stored in its cells), and so on.

Erased Page Pool (EPP). This is the set of erased (blank) physical pages. This pool initially contains all pages. It shrinks whenever an erased page is written to (moves to the DPT), and expands whenever blocks of pages are erased Retired Page Pool (RPP). This is a set of retired pages, namely pages that contain invalid data. It is initially empty. It expands whenever a DPT page cannot be overwritten (in-place overwrite) with the desired data or when a page is deleted by the host (logical deletion, not cell erasure), and shrinks whenever a member page is erased (moves to the EPP) or written to (moved to the DPT). The RPP typically also has metadata in support of the specific RPU policy being used. This metadata can be per page, or a data structure that organizes the RPP pages (pointers to them) in a particular order.

Remark. Additional metadata, such as the number of erasures, may be maintained for all pages (individually or per physical block) in support of erasure decisions and wear-leveling considerations when picking a page from the EPP. This, however, is not specific to RPU and does not interfere with it, so we ignore it.

Writability Checker

Basic operation (feasibility): given a page of data and a candidate target physical page, compare the two and determine whether the data page can be written to the target page without having to reduce the level of any cell. This test can be assisted by metadata stored with the candidate physical page. For example, if a cell can only be changed from '0' to '1' and the number of '0's in a candidate target page is greater than the number of '0's in the data page being written then successful writing is impossible.

Policy agnostic tests: Compute the cost of writing to a given feasible target page. (E.g., the number of cells whose levels must be raised.)

Policy Engines

Write Policy. Given a page write request that cannot be carried out in place, this engine decides where to write the page, picking either an erased page or a retired one. The policy entails both the type choice and the choice of the specific page within the chosen pool. In another embodiment of the current invention, the policy engine may consider writing to a retired page even if writing in place is possible. A reason for so doing may be that the levels of fewer cells may have to be raised if writing to the retired page than to the current ("in place") page.

Erase Policy. This policy decides when to erase retired pages and which ones to erase. One can use existing erasure policies, which typically involve wear leveling considerations and write amplification (the number of valid pages that have to be moved in order to permit erasure of the block containing them). However, these can be augmented by RPU considerations such as preferring to erase pages that are more "used" and are thus less likely to permit new data to be written to them, (With SLC, this means a larger number of '1's. With MLC, a more complex measure would be appropriate, and may depend on the data encoding being used.)

Figure 3:
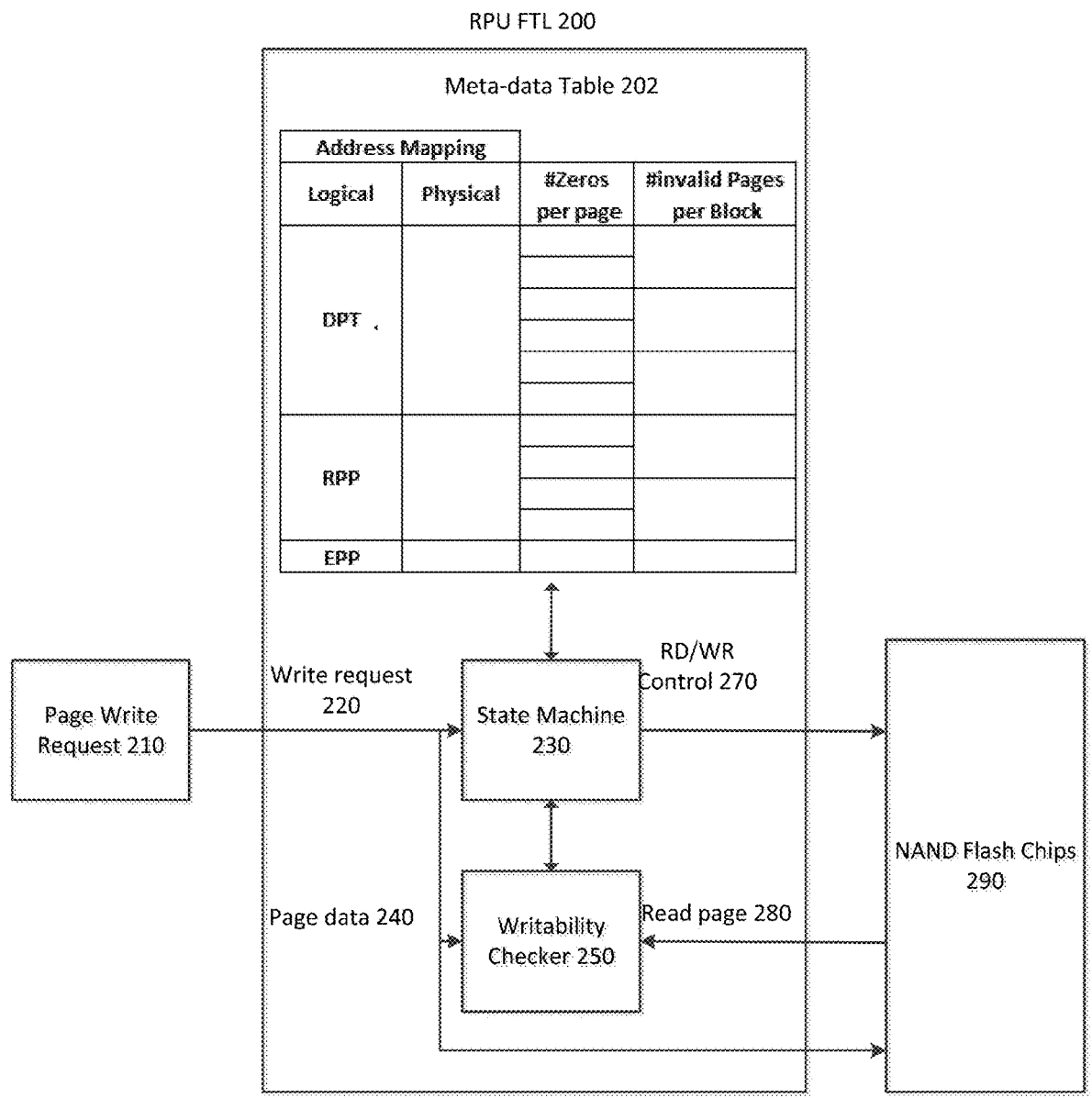
FIGS. 3, 9 and 14 illustrate RPU architectures according to various embodiments of the invention.

RPU architecture is depicted in FIG. 3.

Figure 2:
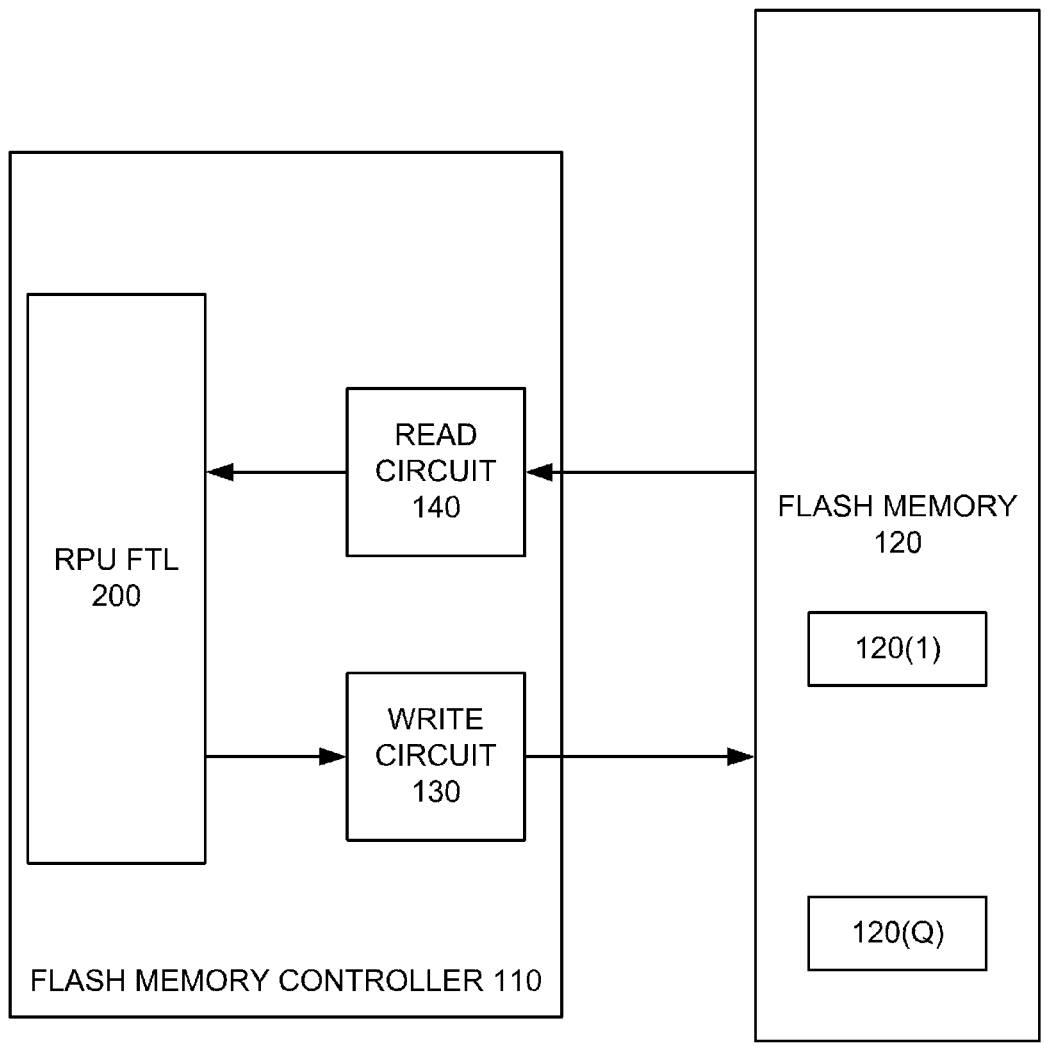
FIG. 2 illustrates a system according to an embodiment of the invention.

The RPU FTL 200 may be implemented by the flash memory controller 110 of FIG. 2. The flash memory controller 110 may access flash memory cells of a flash memory 120 of FIG. 2. FIG. 2 also shows read circuit 130 and write circuit 140 of flash memory controller 110 that interact with the flash memory 120. It is noted that the flash memory may include one or more flash memory chips and may be a NAND flash or an OR flash.

RPU Operation
Initialization
DPT: empty
EPP: contains all pages
RPP: empty
Metadata: no history
Commands
Read
Use DPT to locate desired page and read it.
Allocate New Page
a. Pick a page from the EPP based on the relevant policy. (Can also be picked from the RPP)
b. Move it from the EPP to the DPT, and construct a DPT entry to map it.
Delete Page
a. Remove the deleted page from the DPT to the RPP. Remove its DPT entry.
b. Update any relevant RPP metadata.
Write Page
a. Write in place if possible. Else,
b. Move the DPT page containing the old value (data) to the RPP
c. Write to an EPP or RPP page (use the policy)
d. Move the new page to the DPT
e. Update relevant metadata
Erasure Erasure can be applied to any pages in the RPP as a background operation. As has already been stated, the only relationship to RPU is that the policy for selecting pages for erasure may take into account the "usability" of a retired page, namely the probability that new data can be written to it. For example, a page containing a single '1' is more usable than one containing mostly '1's. Required updates to RPP metadata are obvious.

In summary, RPU is a simple mechanism that can easily be implemented within the common Flash management frameworks. The basic complexity is minimal, but complexity is policy dependent. We next discuss policies.

RPU Policy Considerations

In this text, we do not attempt to construct a specific complete policy. Instead, we introduce various considerations and corresponding policy elements along with some insights. The construction of a complete policy from its elements is straightforward to anyone skilled in the art. We begin with policies for selecting the physical page into which to write the data. This process can be further subdivided into 1) finding a feasible target page and 2) choosing among multiple such pages. We next list the considerations in no particular order.

Ease of finding a writable page. Obviously, a "less used" page is more likely to admit any given data. The number of pages that need to be checked until a feasible one is found is minimized if they are sorted in ascending order of "fullness" and are considered in that order. For SLC devices, the measure is simply the number of '1's in the page. For MLC devices, measures such as the sum (over page cells) of levels and the number of maximum-level cells are examples of relevant measures. The appropriate measure may moreover depend on the data representation (encoding). Of course, this consideration (in isolation) calls for writing to erased (EPP) pages whenever possible.

Minimum total level change. Here, the idea is that the reason that a page becomes less writable is that the higher the levels of its cells, the lower the probability that any give data can be written to that page without requiring level reductions. Accordingly, we pick the page such that writing the data to it would require the minimum sum (over cells) of level increases.

Minimum maximum level. With certain data representations, including WOM codes for MLC as well as certain floating codes, writing to a page entails at most a single-level increase to one or more of the cells. In this case, it is most important to defer the reaching of the top level at any cell. Accordingly, one may prefer the page whose maximum (over cells) level would be the smallest following the write.

Write to "fullest" page. The "fuller" a page (e.g., the more '1's in an SLC page), the smaller the probability that new data be writable to it. Therefore, if new data is writable, seize the opportunity that is unlikely to occur again.

Wear leveling. Clearly, a page that is written to is more likely to be retired and to have to be erased. So, one may try to refrain from writing to pages that have been erased many times. This refers mostly to choosing among erased pages.

Hybrid and adaptive policies. It may sometimes be advantageous to use different policies at different stages in the life of an SSD and for different use cases. Examples:

Use the "minimum total level change" policy initially, thereby minimizing the mean "consumption rate" of the SSD. However, as pages in the RPP become "fuller", change to the "minimum maximum level" policy in order to minimize the probability that a page will become useless due to very few cells having reached the top level.

Use a policy that minimizes the search time for writes that require immediate acknowledgment, heavy load situations, etc., and otherwise use wear conscious policies.

Minimize search time but try to find more than one feasible target page, and use some other policy to decide among the candidates.

Use the "minimum level change" policy, unless a "very full" page is feasible, in which case write to it.

Finally, we note that the best policy may also depend on the nature of the data being written. This is a rich area for further research.

RPU Example

In this text, we present an RPU example using a specific policy. We use this example both for illustration purposes and in order to give a feel for the required complexity and overhead. For simplicity, we consider single-level (binary) cells and a data representation that is the data itself (no coding). This policy is also used for our simulations.

FIG. 3 illustrates an RPU architecture. It includes a retired page utilization flash translation layer (RPU FTL) 200 that include metadata table 202, a state machine 230, and a writability checker 250. It (RPU FTL) may be fed with page data 240 and write requests 220 from by a write page requester 210 and may exchange data with NAND flash chips 290. The state machine 230 can access the metadata table 202 and send control signals (RD/WR control 270) to the NAND flash chips 290. The read page 280 from NAND flash chips 290 can be sent to writability checker 250 to be compared to the page data 240 in order to determine whether the data page can be written to a candidate page and the result is fed to the state machine 230.

The metadata table 202 may include logical and physical addresses of pages that belong to the DPT, RPP and EPP, and for each page they may include additional metadata such as number of zeroes per page and may include a counter of number of invalid pages per erase block. The metadata table may, for example, include a type of writing metadata column indicative of a manner of writing the representation of data to the selected group—normal manner or inverted (complimentary manner).

Policy

Preference is given to in-place update (this is a specific policy example!). If this fails, a limited number of retired pages are considered in ascending order of the number of '1's that they contain. If none of those can accommodate the data being writing without being erased, an erased page is sought. Finally, if all fails, a block is erased, thereby producing erased pages. (As in prior art, if no erasable block is found, data is copied between block so as to make at least one block contain no valid data, thus making it erasable.)

Metadata logical-to-physical address table. RPU's table is similar to conventional FTL tables. For 512 GB SSD and 4 KB physical page size, table size is 128M addresses. Each address is $\log_2(128M)\sim 27$ bits. The required RAM size is ~3.5 Gb=432 MB.

Sorted list of the number of zeros in each ssd page. For typical page size of 4 KB, 15 bits per page are required. For 512 GB SSD, additional RAM size is 240 MB.

Number of invalid pages in each block. Typically 64-128 pages are associated with erase block. RPU has 7 additional bits for each block. In 512 GB SSD, RAM overhead is 1-2 MB.

Write Latency Overhead

Writing to all but erased physical pages requires reading them in order to perform the writability test. (Candidate target pages can sometimes be eliminated merely by examining the number of '0's in the data and in the candidate target page, as if the former is greater than the latter writing is never possible. The number of '0's is part of the metadata.)

The writability test (cell by cell comparison to ensure that the data level is not lower than that of its target cell) is performed by a firmware controller or CPU. It can be pipelined with page read, as memory interface outputs byte by byte. Therefore, RPU latency approximately equals the number of page comparisons performed.

In Flash, reading is much faster than writing −50 μS vs. 900 μS, a 1:18 ratio. Therefore, many page comparisons can be performed at a moderate write-latency penalty. In fact, if the system comprises multiple physical memory banks with means of accessing them in parallel, it may be possible to evaluate multiple candidate RPP pages concurrently, thereby reducing the latency.

Write latency represents a trade-off between endurance and write performance. As more invalid pages are examined, overwrite probability increases but so does latency. In the simulations, we will see that a very small number of comparisons suffices for a significant increase in write capacity.

Write delay elimination by caching. The order in which RPP pages may be considered for overwrite may depend on some property of their's (e.g., the number of '0's in a page and/or the number of times they have been erased). The metadata listing them moreover has them sorted by that order. Finally, the number of candidates that are considered per write is small (fewer than 20) for excellent results. Consequently, it is possible to keep the actual pages that are at the top of the RPP list in cache or some other form of faster memory and perform the writeability tests on the cached copies. Once a target page is chosen, data is written to Flash, and cached page is replaced with the next one in the RPP ranked list. With this, each page write incurs at most one read from flash (the replacement page), and a failed write attempt does not alter the cache at all. As shown, even if RPP size is large, more than 94% of successful overwrites are acquired with a single page comparison, so indeed a small number of pages in cache suffices.

Other delay aspects. Another RPU delay aspect is calculating the number of zeros in a page and inserting it into a sorted list in RAM. Counting zeros can be done in parallel with page comparison, and list insertion delay is hidden by the long write time.

The delay of the control state machine (a simple machine that is omitted for brevity) itself is negligible.

Making RPU Effective

Having presented RPU and offered insights pertaining to retired-page selection policies, in this text we turn our attention to the effectiveness of the scheme. We begin with a simple probabilistic analysis, gain insights and then discuss the combination of target page flexibility (RPU) with data representation flexibility as the recommended approach.

Probabilistic Performance Insights

RPU's main contribution is the provision of a choice among several candidate target pages. To assess the benefit of this flexibility, consider a situation wherein there is a choice among r possible target pages, and a probability p of being able to write to any given candidate page. Then, the probability of a successful write is given by $1-(1-p)^r$ and the probability of failure is $(1-p)^r$.

Figure 4:
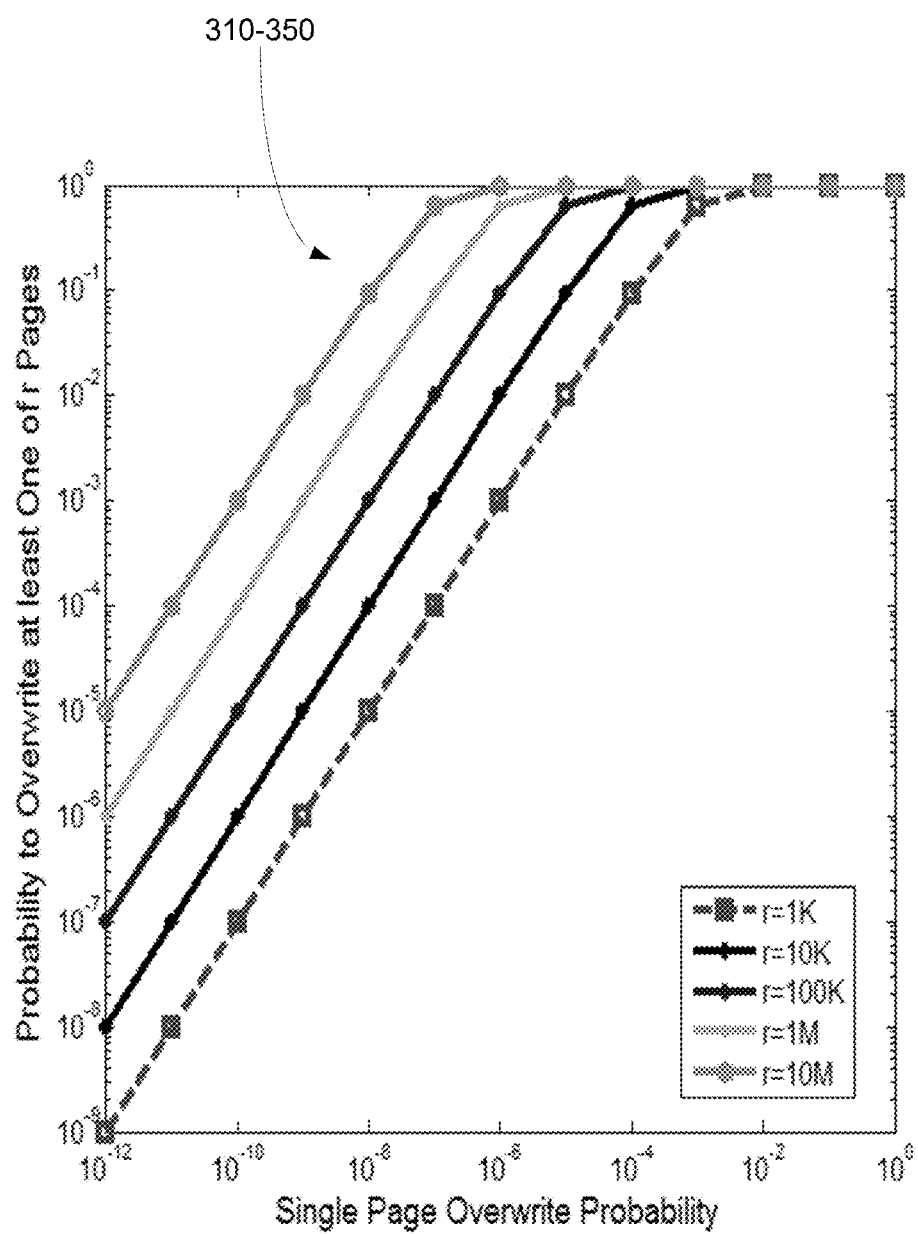
FIGS. 4, 5A, 5B, 6A, 6B and 17 illustrate various analysis results according to various embodiments of the invention.

FIG. 4 includes curves 310-350 that represent the probability that at least one of r candidate retired pages can be overwritten with new ("random") data versus p. Plots (310-350) are shown for several values of r, ranging from 1 k, 1K, 100K, 1M and 10M respectively.

For small values of r, it is evident that RPU makes a very good situation excellent, cannot help much (is unlikely to provide the required probability of success) when the situation is very bad, and can make a meaningful difference in the intermediate range. Having said this, it is nonetheless important to note that failure to write to any of the candidate retired pages is not a disaster; it merely means that one must write to an erased page, and to erase a block of pages if no erased pages are available. Our focus, as stated earlier, is on increasing the normalized write capacity, and the most useful indicative measure for that is the mean number of writes to a page between erasures thereof. A 10% probability of successful write to a retired page increases this number by 10%.

We have shown that the added value of RPU depends both on the number of offered choices (r) and on the probability (p) that any choice is writable. In the remainder of this text, we will both elaborate some more on the issue and discuss means for making RPU more effective. Throughout the text, we assume that all the data being written is "random" with bit values being 0 and 1 with equal probabilities and independent from bit to bit.

Retired Page Pool (RPP) Size

The probability of successful overwrite depends on the absolute number of choices r, regardless of total storage capacity. Therefore, and in view of the fact that our true measure of success is the normalized write capacity, r can be independent of SSD capacity.

Clearly, checking millions or even hundreds of retired pages for writeability is impractical in most situations for latency and throughput reasons. To this end, we make two important observations and refinements based on them:

A data page containing more '0's than a candidate target page cannot be written to that target page. Therefore, one can keep the number of '0's in every retired physical page as metadata, and check for the necessary condition; the entire candidate page will be read only if it is met.

The probability that a given data page can be written into a candidate retired physical page increases with an increase in the number of '0's in the target page. Therefore, one can examine the most probable pages first, thereby dramatically reducing the number of pages that must be considered for a given probability of success.

In fact, one may elect to sharply reduce the RPP and place in it only "good" retired pages, with others sent for erasure. It is furthermore possible to select a total number of extra pages based (beyond the declared capacity) mostly on the usual considerations such as keeping write amplification in check. These would constitute the RPP and EPP. A quality indicator (possibly a single bit of metadata per RPP page indicating whether it has more than a certain number of '0's) would be kept. Preference for overwrite will be given to the "good" pages, while preference for erasure would be given to the "bad" ones.

One should, however, be careful not to make the RPP too small, because the number of "good" pages in the RPP is not fixed. When data is written into a "good" RPP page, the previous page occupied by that data joins the RPP. If that page is not a "good" one, however, the number of "good" RPP pages decreases. The overall RPP size should be such that the number of "good" pages in it stays above a desired threshold with high probability in order not to reduce the probability of finding a writable candidate in the RPP. Finally, it should be noted that not all "good" pages need to be examined for a given write.

In the appendix, we prove the overwrite probability depends on the difference in the number of zeros between the stored page and input page. We also prove that the probability decreases in factorial pace as the difference grows. RPU has a sorted list of the number of zeros of each page.

We now turn to explore single-page successful overwrite probability, and the means to bring it to reasonable values where RPU is efficient.

Single-page Overwrite Probability

Consider a given n-bit SLC page containing random data, and a candidate similar target page that has had random data written to it once. The probability that the new data can be written to this target page is $0.75^n$. Clearly, this probability is very small for any reasonable page size, e.g., $\sim 10^{-8}$ for 60 bits. This probability becomes even smaller with retired pages that have had data written to them more than once. Therefore, alternative data representations or coding techniques are required in order to increase single-page overwrite probability to a reasonable level ($10^{-4}$ to $10^{-7}$ according to FIG. 4) for RPU to be effective.

The only effective way of so doing is schemes that permit multiple representations of the same data (information), thereby offering "what to write" flexibility, augmenting the "where (in which page) to write" flexibility offered by RPU. Unlike RPU, these require substantial redundancy (a capacity penalty). Also unlike RPU, this redundancy is intra-page (or per page) rather than in the form of additional pages. Also, while extra pages are required anyhow because erasure is in multi-page blocks and due to write amplification issues, and their number is not necessarily increased by RPU, here the redundancy is solely for improved overwrite probability.

We next review and discuss several such schemes.

WOM Codes

WOM codes typically involve an exponential degree of redundancy ($\sim 2^k$ cells for storing k bits of information). With linear WOM codes [10], for example, the value of the data is encoded as the sum of the values of the bit positions in which there are '1's, modulo $2^k$. Overwriting requires a change to this value that is equal to the difference between the values of the new information and the old one. If the cell at the corresponding location contains '0', a '1' is written to it. Otherwise, a combination of two '0' cell positions whose sum equals the required value is sought. Upon failure, a page is retired. (In principle, larger multi-cell combinations may be used but this becomes more time consuming.)

WOM codes guarantee a certain (code dependent) number of successful writes. The success probability of further writes declines at a rate that depends on the code and block length. Recent work [22, 23, 24, 25, 26] examines the successful-write probability distribution of linear WOM codes.

Figure 5A:
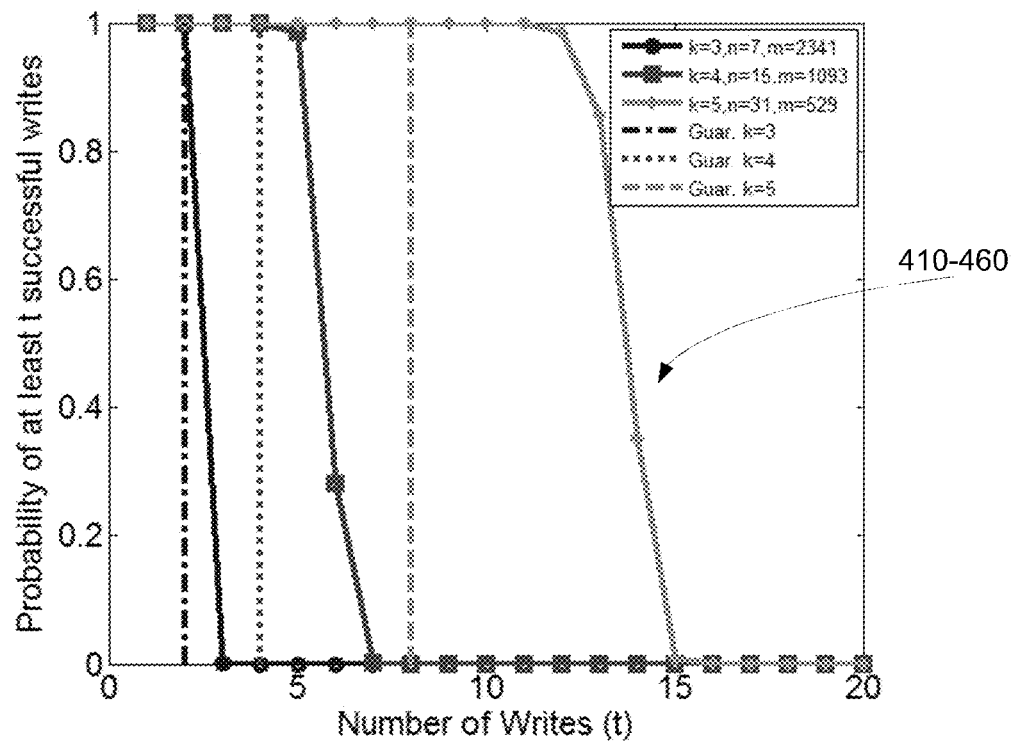
Figure 5B:
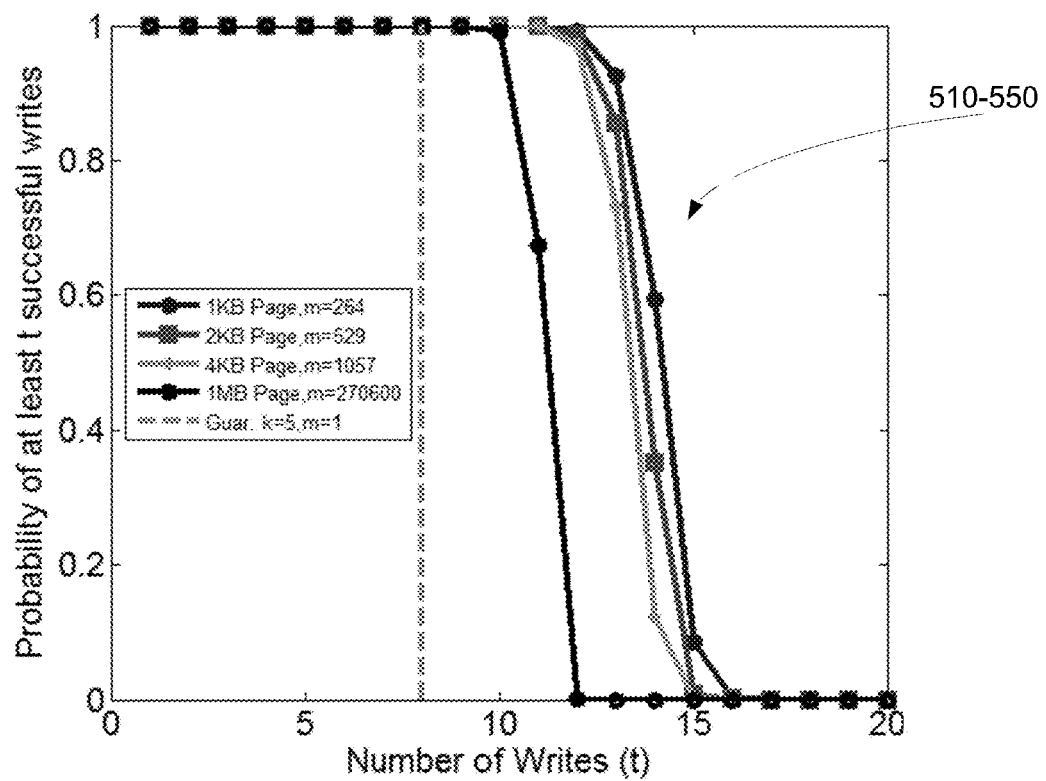

2 kB pages were partitioned into n-bit chunks, where each chunk is an independent WOM unit. Each n-bit chunk represents k data bits encoded to n=k+redundancy bits. (Bits were added to the pages so as not to change the amount of information per page.) Analysis results are shown in FIGS. 5A-5B, adapted from [26]. It can be noticed that as k increases, the write probability decreases at a more moderate rate beyond the guaranteed number of writes. FIG. 5A shows curves 420, 440 and 460 for (k=3, n=7, m=2341), (k=4, n=15, m=1093) and (k=5, n=31, m=529) respectively and curves 410, 430 and 450 for guaranteed for k=3, k=4 and k=5 respectively.

The WOM can include linear WOM, tabular WOM, coset-encoding techniques and floating codes It is noted that the atomic size in which RPU is performed can be also on whole erase blocks, or groups of pages.

FIG. 5B shows curves 520-550 for (1 KB page, m=264), (2 KB page, m=529), (4 KB page, m=1057) and (1 MB page, m=270600) respectively and curve 510 for guaranteed for k=5, m=5 respectively.

FIGS. 5A-5B suggests that some writes are possible with a significant probability beyond the guaranteed writes. By also using RPU, this probability becomes very high! Even when write probability drops to small values, e.g., 0.01, also using RPU raises it to "interesting" values. (See FIG. 4).

Figure 6A:
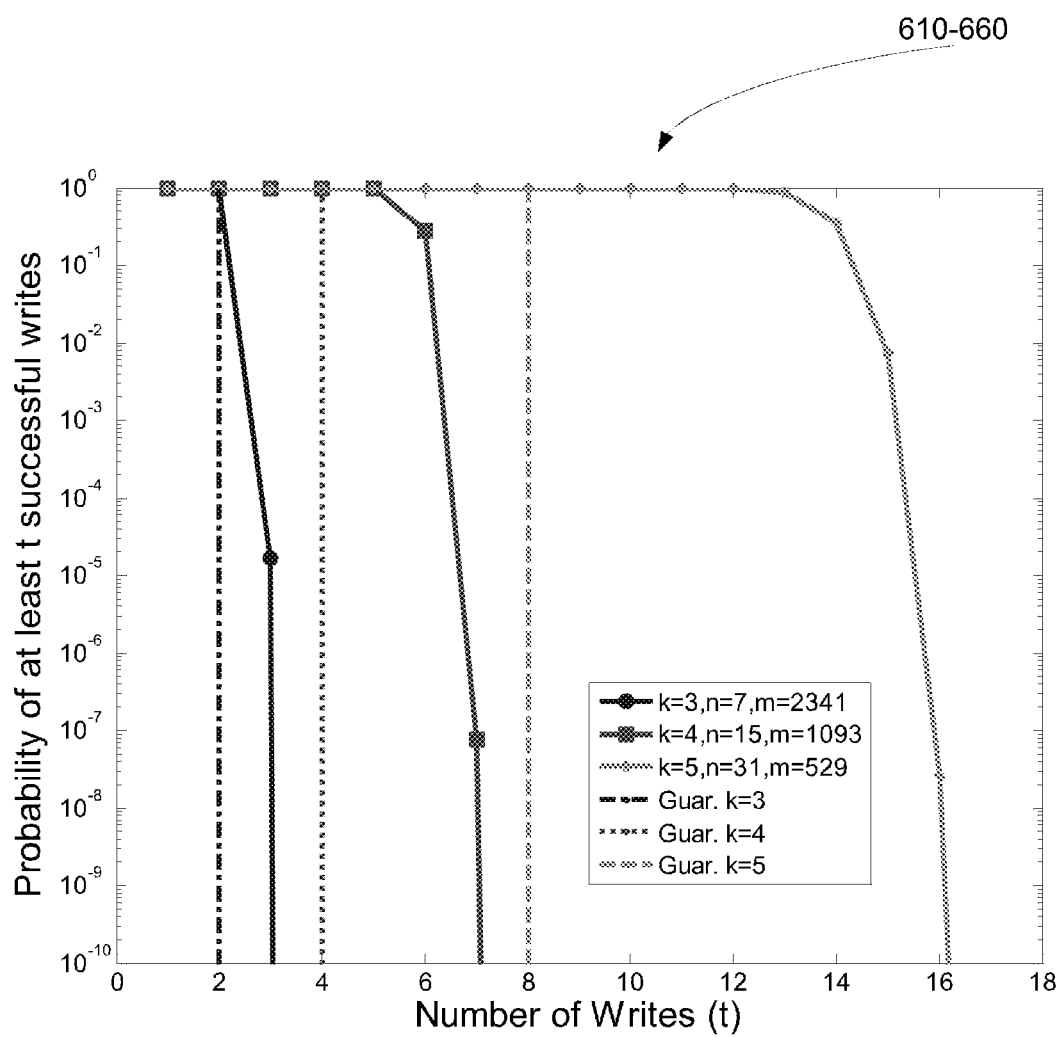
Figure 6B:
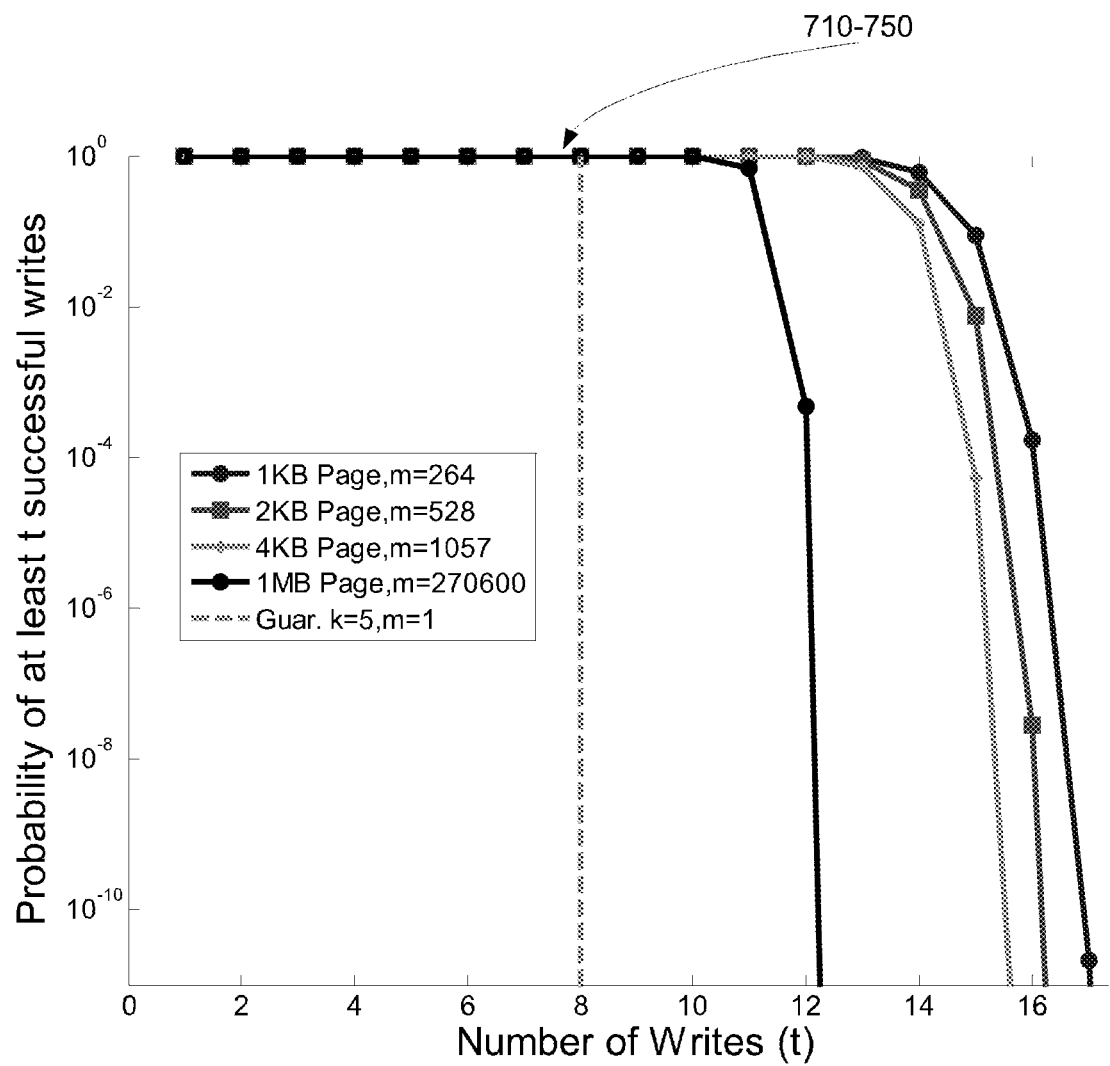

We further analyze WOM for the probability of at least t writes for values as small as $10^{-7}$, values that are normally impractical and were therefore not considered in [22, 23, 24, 25, 26]. Results are shown in FIGS. 6A-6B. The detailed analysis shows that additional writes are made possible with RPU. For example, using linear WOM chunks of (k,n)=(3,7) n=7 over 2 KB page without RPU results in two guaranteed writes. The third write succeeds with probability $\sim 10^{-4}$.

FIG. 6A shows curves 620, 640 and 660 for (k=3, n=7, m=2341), (k=4, n=15, m=1093) and (k=5, n=31, m=529) respectively and curves 610, 630 and 650 for guaranteed for k=3, k=4 and k=5 respectively.

FIG. 6B shows curves 620-650 for (1 KB page, m=264), (2 KB page, m=529), (4 KB page, m=1057) and (1 MB page, m=270600) respectively and curve 610 for guaranteed for k=5, m=5.

By also using RPU with RPP=100 the $3^{rd}$-write success probability is practically one.

Coding for Increased Overwrite Probability: Segmented-Inversion Codes

Since RPU depends only on single-page overwrite probability and not on the number of guaranteed writes, we now turn to develop a coding scheme that enhances overwrite probability with smaller redundancy than conventional WOM codes.

Since a '1' can be written over a '0' but not vice versa, we next present a simple scheme that increases the number of '0's in the first write and reduces it in the second and later writes to a page. (Further analysis is provided in the appendix.)

Specifically, we partition the page into k-bit chunks. For each chunk, we count the number of '0's. If it is at least k/2, the data is stored as is. Otherwise, the bitwise complement is stored. In subsequent writes to the same physical page, we try both options. The metadata table of the RAT FTL may store metadata indicative of how the data was written.

This scheme requires one information bit for metadata per chunk. However, since the value of the metadata bit may have to change from 1 to 0, several bits are assigned. This number is related to the expected number of successful overwrites and is thus very small. Moreover, it can be kept arbitrarily small at the expense of losing the inversion option once it has been exhausted.

We analyze segmented-inversion code in the appendix and explore the number of inversion bits required to raise page overwrite probability such that it can be further utilized by RPU.

Error Correcting Codes

It is important to note that any error correcting code can be used in order to offer data representation flexibility. For example, given a chunk of data using an ECC that can correct certain errors, any "correctable" erroneous representation of the data may be stored. For example, if any r errors can be corrected, up to r '0's may be written to cells containing '1' (leaving the '1' in place, of course). Note that the power of the code can be exploited in full, because the "errors" are known in advance, as is the code's ability to correct them. Therefore, codes with non-uniform correcting power are also fully exploitable [27, 28].

Evaluation

In this text, we evaluate RPU in conjunction with segmented WOM codes, and compare the resulting normalized write capacity with that of segmented WOM codes alone.

The comparison is carried out for random data; i.e., each data bit is '0' and '1' with equal probabilities, and bit values are i.i.d. Nonetheless, the fact that the content of a page to which random data has been written more than once is biased towards consisting of more '1's is properly taken into account.

The results for segmented WOM codes alone were obtained analytically by adapting the analysis in [26], whereas those for WOM+RPU were obtained by simulation.

Study Details

The RPU policy may be limited to 18 writability tests per page. A page was removed once it had been erased a number of times equal to its endurance and had to be erased again. Perfect wear leveling was assumed. The simulation tracked the actual content of every page.

The simulations were run for several sets of parameter values, as listed in FIG. 8.

Each run started with all pages containing random data encoded with piece-wise linear WOM code. The simulation stopped when a page could not be written, and no RPP page was erasable because they had all reached their endurance limit. The total number of page writes until that time is the (sample of) total write capacity, and dividing that value by product of the total number of physical pages and the (physical) endurance yielded the normalized capacity. As storage overhead (redundancy) was essentially the same for the two schemes being compared, it did not affect the comparison.

The piecewise linear WOM [20] Entails dividing the page into segments such that the cells in each segment are used to form an independent linear WOM group. Their fates in terms of writability are i.i.d. except for the effect of the data that they already contain; in all cases they are independent of one another. To succeed in writing a page, all segments must succeed. The benefit of the segmentation is that it enables better control over the trade-off between the level of intra-page redundancy and the write capacity.

Write capacity of RPU on top of piece-wise WOM vs. piece-wise WOM alone (prior art). Simulations were performed with independent, uniformly random distributed data. (a) Piece-wise wom k=3, n=7. RPU improves write capacity by 5% for r=100 (0.90 versus 0.86) and 29% for r=1000 (1.111 versus 0.86). (b) k=4, n=15. RPU improves write capacity by 57% for r=100 (1.68 versus 1.07) and 65% for r=1000 (1.76 versus 1.07). (c) k=5, n=31. RPU improves write capacity by 84% for r=100 (2.37 versus 1.29) and by x2.11 for r=1000 (2.73 versus 1.29).

Figure 7:
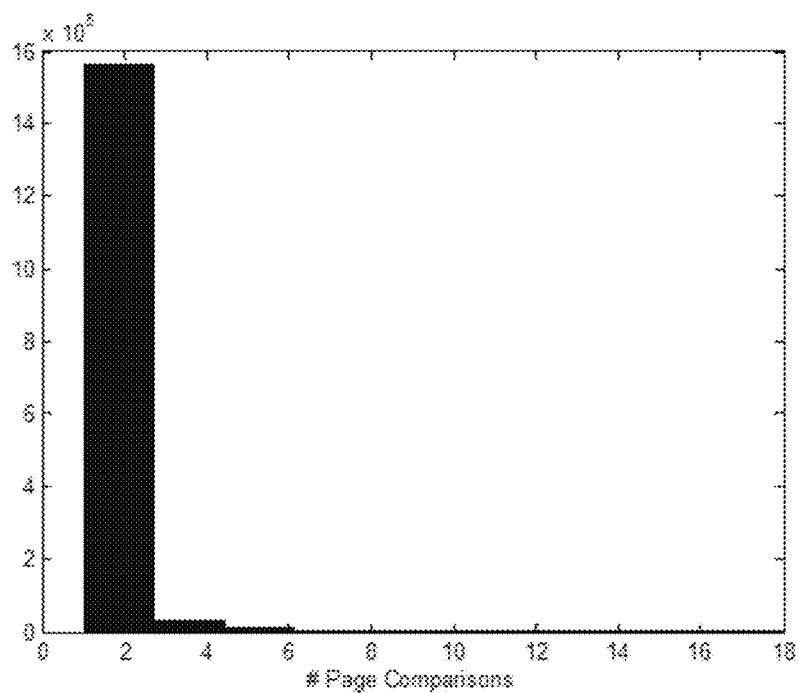
FIG. 7 is histogram of the number of page comparisons in case of successful overwrite according to an embodiment of the invention.

FIG. 7 is histogram 800 of the number of page comparisons in case of successful overwrite. In 94.32% of the cases, only one comparison was required. FIG. 8 900 provides a table that illustrates between SSD parameter used in simulations.

A linear WOM code guarantees a parameter-dependent number of writes. Additional writes are possible, but their success probability drops quite rapidly. Therefore, the probability of a successful write to all WOM code segments of a given physical page is essentially a step function: guaranteed success up to the guaranteed number of successful writes, and a negligible probability of success for any additional writes. A linear WOM code with k information bits has a chunk size of $n=2^k-1$ bits and guarantee $2^k/4$ writes.

In each simulation, we measured RPU on top of piece-wise WOM (prior state-of-the-art) write capacity and compare it to only piece-wise WOM coding.

For simulation time considerations, two settings were considered: 1) an SSD with 1 k pages with endurance of 100 erasures cycles per erase block, and 2) an SSD 10 k pages and endurance of 10 erasures cycles per erase block. Each of these two configurations was evaluated for three possible piece-wise WOM code parameter sets. The simulations were run multiple times to validate the results.

Results

Simulation results indicate that RPU improves the write capacity by up to 2.1. The improvement grows as RPP grows and as piece-wise linear WOM uses bigger chunks. For (k=3, n=7) piece-wise WOM, RPU improves write capacity by 5% for RPU=100 (from 0.86 to 0.90) and by 29% for RPU=1000 (from 0.86 to 1.11). For (k=4, n=15), RPU improves write capacity by 57% for RPP=100 (from 1.07 to 1.68) and by 65% for RPP=1000 (from 1.07 to 1.76). For (k=5, n=31), RPU improves by 84% for RPP=100 (from 1.29 to 2.37) and by 2.1× for RPP=1000 (from 1.29 to 2.75). We expect the results to further improve when using bigger RPP size, such as 10K or 100K pages.

A histogram of the number of required page comparisons for overwrite examination is shown in the histogram 800 of FIG. 8. We observe that in 94.32% of the cases, a single comparison sufficed, and three comparisons virtually always suffice. Therefore, in this case the overhead in write latency is negligible (additional 50 μS for 900 μS page write). With the aforementioned caching, the cache traffic and comparison work are also minimal. The SSD parameters used are illustrated in table 900 of FIG. 8.

Conclusions

Aggressive device scaling and switching to MLC architectures make write capacity a critical parameter in SSD design. In this paper we presented Retired Page Utilization (RPU), which utilizes retired pages rather than always erasing them. It moreover offers a choice of among several candidate retired pages, thereby increasing the probability of successful overwrite. When used in conjunction with codes that offer "what to write" flexibility, up to a twofold increase in normalized write capacity is achieved relative to the use of those codes alone. RPU efficiency grows as single page overwrite probability increases (either by WOM coding or other data manipulation scheme) and as the number of pages in the retired page pool (RPP) grows.

We analyzed RPU overhead and found it to have a small footprint of up to tens of megabytes. Its SSD space overhead is essentially non-existent, as spare pages exist anyhow, be it for wear leveling, efficient erasure (low write amplification), fault tolerance, etc. These spare pages can constitute the retired page pool.

The access latency penalty is tiny, because the current RPP write candidate pages can be cached in SRAM. (Only some 4-8 pages are needed at any given time.)

The evaluation was carried out for SLC, but the scheme itself is equally applicable to MLC and was described as such.

In summary, RPU is an extremely effective, low cost, simple scheme for increasing write capacity, and particularly excels in conjunction with appropriate codes that offer data representation flexibility.

RPU Implementation Examples

The following provides a non-limiting example of an RPU. A much simpler algorithm can include determining whether to write a representation of a data unit to a retired group of flash memory cells even regardless of the number of previous write operations.

First Example

INITIALLY, all physical pages are blank (ERASED). RETIRED PAGE POOL (RPP) is empty; DATA PAGE POOL is empty; ERASED PAGE POOL contains all pages.

1. Writing a DATA PAGE:

1.1 Examine zero or more retired pages and the physical page containing the old content of the data page (relevant unless first writing of said data page) and, if possible, choose one of those physical pages for writing the data page. If no such page is found, select an ERASED physical page from the EPP.

1.2 If a physical page is found, write the data page into the chosen physical page If different than the physical page holding the old content of the data page, then move the selected physical page to the DPP, and move the old physical page into the RPP. Next, update the FTL (mapping) so that the entry for the data page points to the physical page holding its current value.

1.3 If no physical page is found to which the data can be written, erase at least one physical page of the RPP and write to it. If necessary, move page data to other pages in order to create an erasable block. Then, return to 1.1 (note that at this point there are possibly new retired pages that may be usable)

1.4 If no page is found and none can be vacated, declare failure.

As is done in prior art, for example in flash memory controllers, block erasure can be carried out in the background without waiting for there to not be any erased page.

Second Example

RPU control state machine manages the address translation table, valid and invalid data placement, page overwrite, erase and evacuation operations. We ignore read requests since those do not effect RPU and either capacity or endurance.

Figure 10:
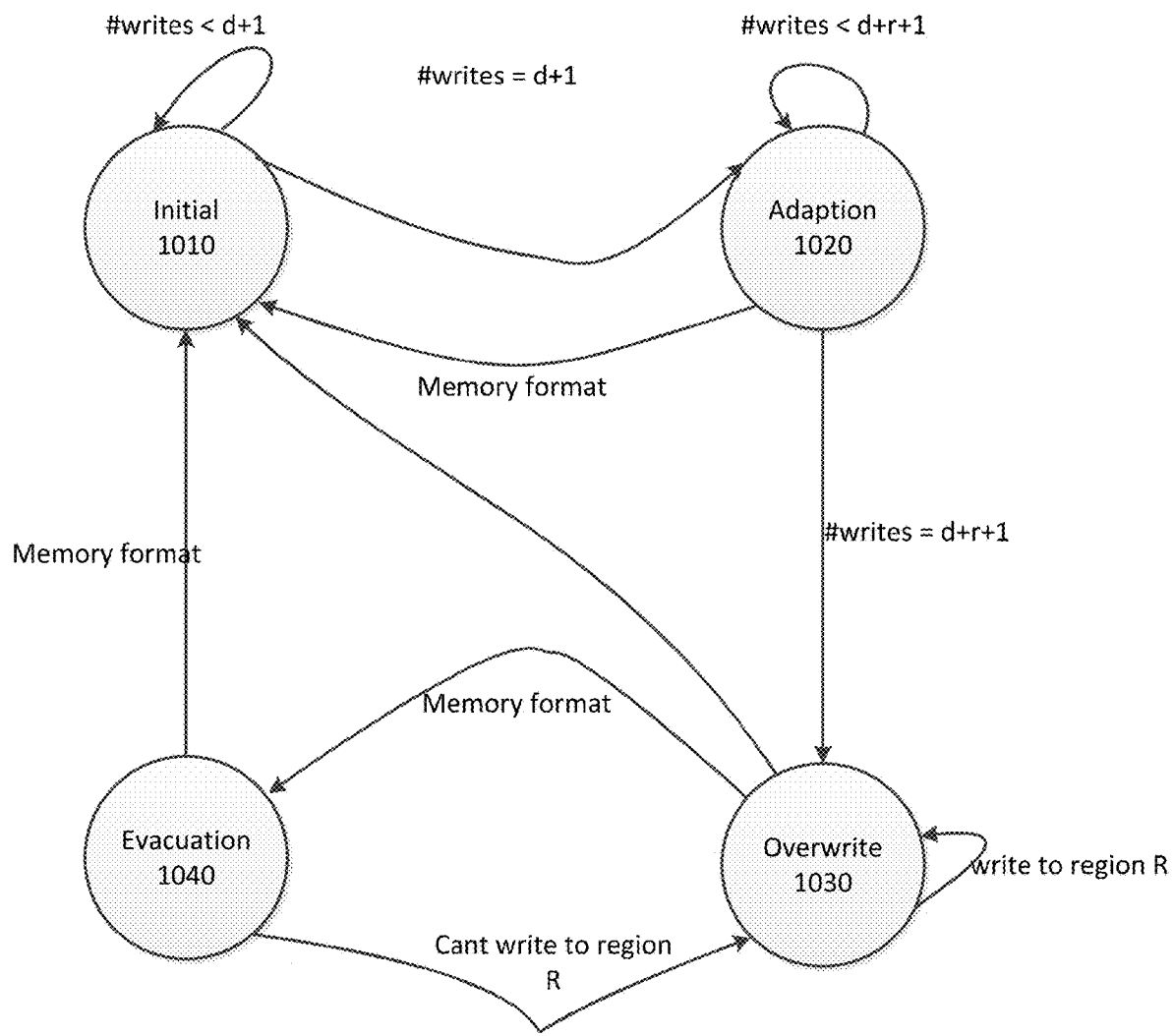
FIG. 10 is a state diagram according to an embodiment of the invention.

FIG. 10 is a state diagram 1000 that includes stages initial 1010, adaptation 1020, overwrite 1030 and evacuation 1040.

Initial State 1010: First d Writes

In initial state, the host performs d writes over erased memory. Every written page is assigned to D group. Some of those writes may refer to logical addresses that already had been accessed (pointing a non-empty page). In this case, RPU FTL assign the invalid physical page to R group, and the page is written on erased page at D. The process is followed by update of logical-to-physical mapping. In case that the host explicitly mark page as invalid it is also transferred to R.

Unlike RPU, the garbage collection mechanism in conventional implementation gathers the invalid pages and performs erase. Erase timing is carried at predefined states such as ideal state.

In write d+1 the state is transformed to adaption state.

Adaption State 1020: Writes #d+1 to #d+r

The following r writes would be written to memory using erased pages from R section. After d+r writes, at most d pages occupied with valid data, and at least r pages are marked as invalid. Remind that the reported capacity is of d addresses, storing of additional data implies deletion of remaining pages.

In write d+1 the state is transformed to overwrite state.

Overwrite State 1030: Writes #d+r+1 and Beyond

Starting from write d+r+1, any write request would be handled according to the following priority order:

Write over erased page.

Overwrite one of the invalid pages.

RPU keeps meta-data of each page of the number of low levels (zeros) in holds. The values are sorted in descent order. When write applied, RPU follows the sorted list. On top, there are pointers to erased pages. If erased page exists (number of zeros equal to the number of bits in page) RPU writes the data and updates the address to be in D region. Else, RPU goes over the list and search for invalid page that can be overwritten.

RPU invalid page examination is composed of two steps. First, RPU compares list's zeros value with input page value. If list's value is smaller than input value, RPU moves to evacuation state. Else, RPU read the invalid page and compares whether it can be overwritten with input page using RPU comparison block. If successes, page is overwritten and page is assigned to D. Else, RPU moves to the next page in the list. The search process ends either if zeros values comparison fails, list has ended or the number of tests reached predefined timeout constraint.

The timeout constraint implies lower bound on SSD write performance in trade-off to endurance.

If search process ends without overwrite, RPU moves to evacuation state. Else, it stays in overwrite state. Overwrite state algorithm is described in alg. 1.

Evacuation State 1040: Enables to Erase

Evacuation state is reached when input page cannot be written in regions D and R. RPU keeps meta-data of number of invalid pages in each block (sorted). In evacuation state, RPU focus on the block with most invalid pages. RPU copy the valid pages to erased pages in B region and assign their physical pages to D, erases the block, assign part of the newly erase pages to B (until b empty pages reached) and assign the remaining erased pages to R. Having at least one erased page assigned to R, RPU returns to overwrite state.

According to evacuation state functionality, region B require sum of erased pages as the sum of pages in erased block (64-128 in different Flash chips) minus one.

In case of memory format (all content is erased) from every state, RPU returns to initial state.

EXAMPLE

Figure 9:
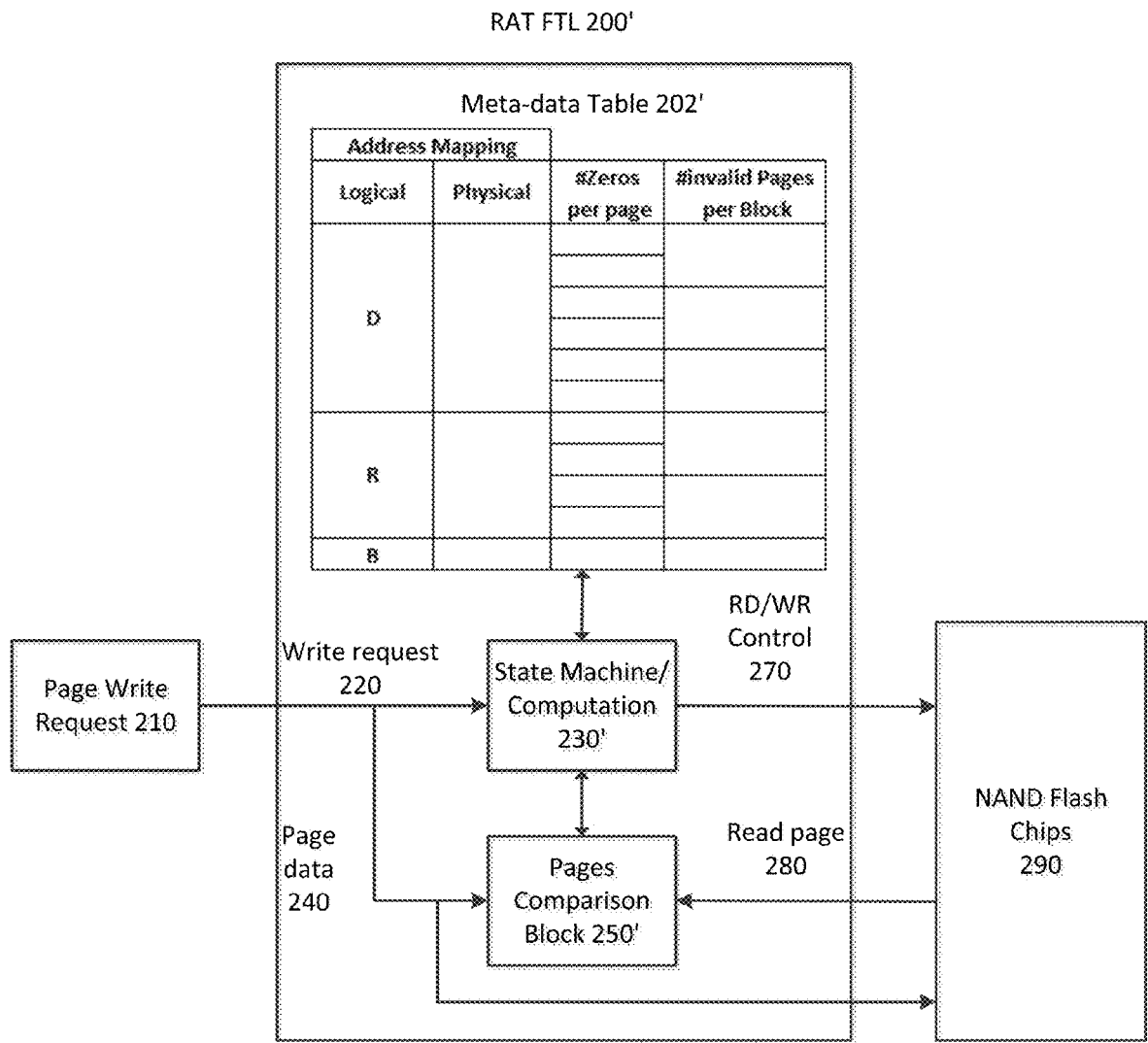

Example of RPU operation is shown in FIG. 9. Memory consists of 8 data addresses D={D-1, . . . , D-8}.

FIG. 9 illustrates an RPU architecture. It includes a retired page utilization flash translation layer (RPU FTL) 200 that include metadata table 202', a state machine/computation module 230', and a page comparison block 250'. It (RPU FTL) may be fed with page data 240 and write requests 220 from by a write page requester 210 and may exchange data with NAND flash chips 290. The state machine/computation module 230' can access the metadata table 202' and send control signals (RD/WR control 270) to the NAND flash chips 290. The read page 280 from NAND flash chips 290 can be set to page comparison block 250' to be compared to the page data 240 in order to determine whether the data page can be written to a candidate page and the result is fed to the state machine/computation module 230'.

Erase block size is 4 pages, such that physical addresses 1-4, 5-8, 9-12, and 13-15 are separated blocks (last is rounded). In addition, memory contains 4 redundant addresses R={R-1, . . . , R-4} and 3 block transfer addresses B={B-1, . . . , B-3}. Accordingly, the memory occupies 15 physical pages.

In the initial state, logical addresses point to physical addresses numbers in sequential order. During the first 8 writes, D region is being filled and RPU moves to adaption state. In adaption, host overwrites data in logical pages D-2, 4, 6, 7. Data is written to erased pages 9, 10, 11, 12 at R region and switched with the corresponding invalid physical pages in D. After 12 writes, RPU moves to overwrite state.

In overwrite, host deletes logical page D-3 (physical page 3) and sends write request (delete have to be performed since the declared capacity is 8 pages). RPU checks R region for possible overwrite with the new requiressted page. Page comparison is performed according to descending number of page's zeros. Successful overwrite is performed at page R-4 (physical page 7). RPU associate the overwritten physical page 7 with D-3 and invalid physical page 3 with R-4. At the end of the process RPU stays at the overwrite state.

Next, host deletes logical page that points to D-8 and sends another page write request. RPU checks R region for overwrite, but non of the pages fits. RPU delays the write request and moves to evacuation state.

In evacuation, RPU chooses the erase block with maximum invalid data pages. The maximum-invalid block is with physical pages 1-4. It occupies three invalid pages (2, 3 and 4). RPU copy the valid physical page 1 to B-1 (physical page 13), and erases the block. Next, RPU maps physical page 13 to D-1, 1 to B-1 and 8 to R-5 (R group had increased by one). RPU returns. Overwrite.

After evacuation pass to overwrite step, write in R region is guaranteed. RPU writes data at page R-1 (physical page 2) and remap it to D-8 at the data region. RPU stays at overwrite state.

In this example, 13 writes were performed before erase was applied, in comparison to 12 writes with current FTL schemes.

Lower and Upper Endurance Bounds

The overwrite probability behavior is dataset-dependent. In the case that it decreases sharply after one overwrite, and every page is overwritten once, endurance increases by factor of 2. The improvement in the number of writes before erase does not depend on the reported capacity, but only on redundant (R) capacity and workload.

Overhead

RPU overhead consists of RAM capacity and delay in write latency. We discuss is separately in the following text.

RAM Overhead

RPU RAM usage is as follows:

logical-to-physical address table. RPU table is similar to conventional FTL table. For 512 GB SSD and 4 KB physical page size, table size is 128M addresses. Each address is $\log_2(128M) \sim 27$ bits. The required RAM size is ~3.5 Gb=432 MB. For 256 GB SSD, the corresponding values are approximately halved (it also holds for other overhead subsections).

Sorted list (decent) of the number of zeros in each memory page. For typical page size of 4 KB, 15 bits per page are required. For 512 GB SSD, additional RAM size is 240 MB.

Number of invalid pages in each block. Typically 64-128 pages are associated with erase block. RPU has additional 7 bits for each block. In 512 GB it is 1-2 MB.

In summary, RPU RAM overhead is about 1.5 of conventional FTL RAM usage.

Write Delay Overhead

Prior to write, RPU reads invalid physical pages and examines them for possible overwrite. Page comparison is performed at firmware controller or CPU. It can be performed in pipeline with page read, as memory interface outputs byte by byte. Therefore, the resulting RPU delay approximately equals the number of page comparisons performed.

Page read is significantly faster than page write –50 µS vs. 900 µS, a 1:18 ratio. Accordingly, many page comparisons can be performed by relatively small write delay.

Write delay is bounded by RPU implementation. As mentioned in 3.2.3, page comparison is performed as long as timeout limit is not reached (it would stop before that if successful overwrite was found, or all pages were searched).

The write delay represents a trade-off between endurance and write performance. As more invalid pages are examined, the higher the overwrite probability. However, increasing page comparisons timeout limit degrades write performance (although in relatively slow rate).

Another RPU delay aspect is calculating the number of zeros in a page and inserting it into a sorted list in RAM. Counting zeros can be done in parallel with page comparison, and list insertion delay is hide by the long write time. The counting of invalid pages in the block and sorted list updating is performed is a similar manner.

The delay of the control state machine itself is negligible due to small number of steps and simple implementation.

Appendix

Analysis of Single-page Overwrite Probability

In order to calculate the overwrite probability for input page over a stored page, we use the following notation:

α—page size
$Z_S$—the number of zeros in stored page
$Z_S$—the number of zeros in input (to be written) page The total possible two pages combinations is $$\binom{\alpha}{Z_S}\binom{\alpha}{Z_I}.$$

The number of combination to choose 1's places in the stored page is $$\binom{\alpha}{\alpha - Z_S}.$$

For each 1 in the stored page there must be a one at the input page, therefore $Z_S \geq Z_I$ else the probability is zero. The remaining $Z_I$ zeros can be arranged in $$\binom{Z_S}{Z_I}$$

combinations at the remaining $Z_S$ places. Therefore:

$$Pr_{OW}(Z_I, Z_S) = \begin{cases} 1 & Z_I = 0 \\ \dfrac{\binom{\alpha}{\alpha - Z_S}\binom{Z_S}{Z_I}}{\binom{\alpha}{Z_S}\binom{\alpha}{Z_I}} & Z_S \geq Z_I, Z_I \neq 0 \\ 0 & \text{else} \end{cases}$$

Since $\dfrac{\binom{\alpha}{\alpha - Z_S}\binom{Z_S}{Z_I}}{\binom{\alpha}{Z_S}\binom{\alpha}{Z_I}} = \dfrac{Z_s(Z_s-1)(Z_s-2)\ldots(Z_s-Z_I+1)}{\alpha(\alpha-1)(\alpha-2)\ldots(\alpha-Z_I+1)}$ and given that page size is constant, we observe that the probability depends on the gap $Z_S - Z_I$.

The probability for overwrite failure over n invalid data pages with $Z_1, Z_2, \ldots, Z_n$ zeros is:

$$Pr_{OW}(Z_I, Z_1, Z_2, \ldots, Z_n) = 1 - \prod_{j=1}^{n}[1 - Pr(Z_I, Z_j)]$$

Since $\alpha \geq Z_S$, the overwrite probability is maximized when $Z_I$ is minimized. This is exactly the case of WOM codes, where the input data is encoded as the stored data with added ones. The maximum probability depends on the ratio of $Z_S$ and α:

$$\lim_{Z_I \to 1} \dfrac{Z_s(Z_s-1)(Z_s-2)\ldots(Z_s-Z_I+1)}{\alpha(\alpha-1)(\alpha-2)\ldots(\alpha-Z_I+1)} = \dfrac{Z_S}{\alpha}$$

The above analysis suggests that the difference $Z_S - Z_I$ has to be maximized. In order to do so, we propose the following overwrite rule: if there are erased pages, encode the page such that the number of zeros is maximized, by either storing it as it or the inverse value. If all pages are programmed, encode the page for minimum zeros. The generalization of this scheme includes dividing the page to chunks with each inverted-bit associated to each chunk. This scheme is referred as segmented-inversion scheme.

Figure 12:
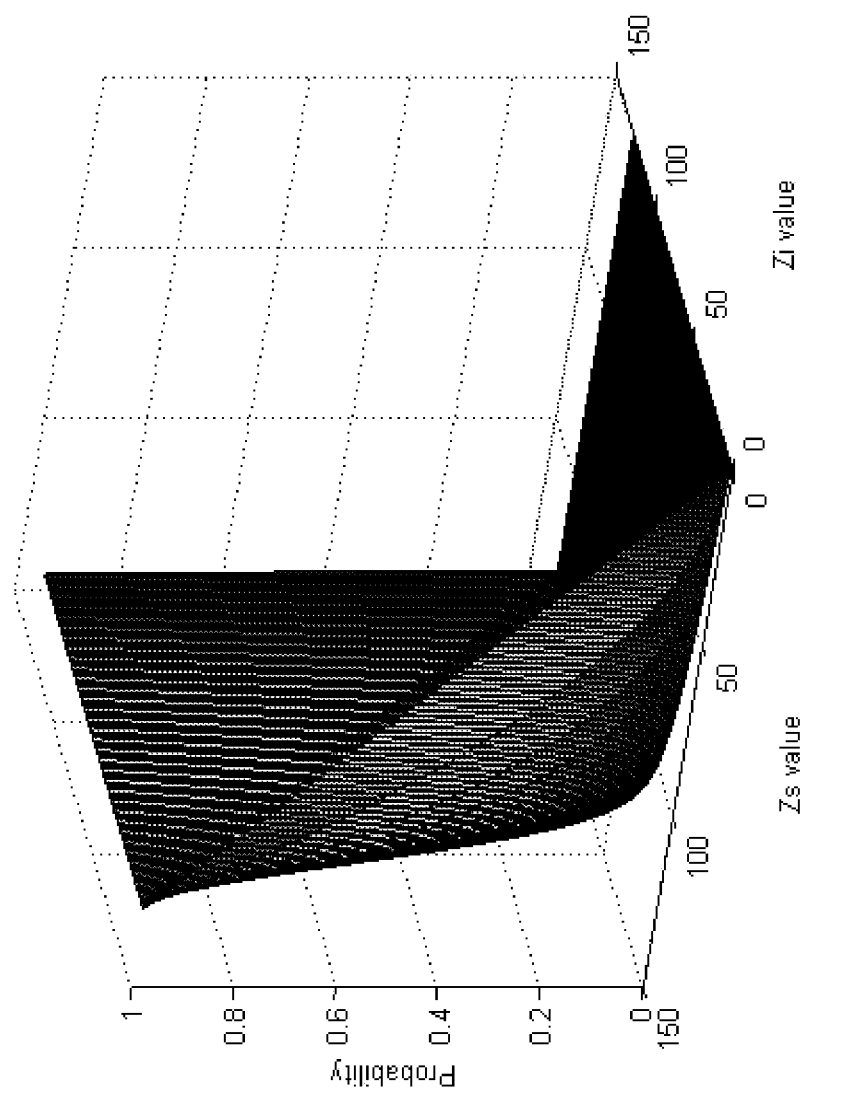
FIG. 12 is a probability curve according to an embodiment of the invention.
Figure 13:
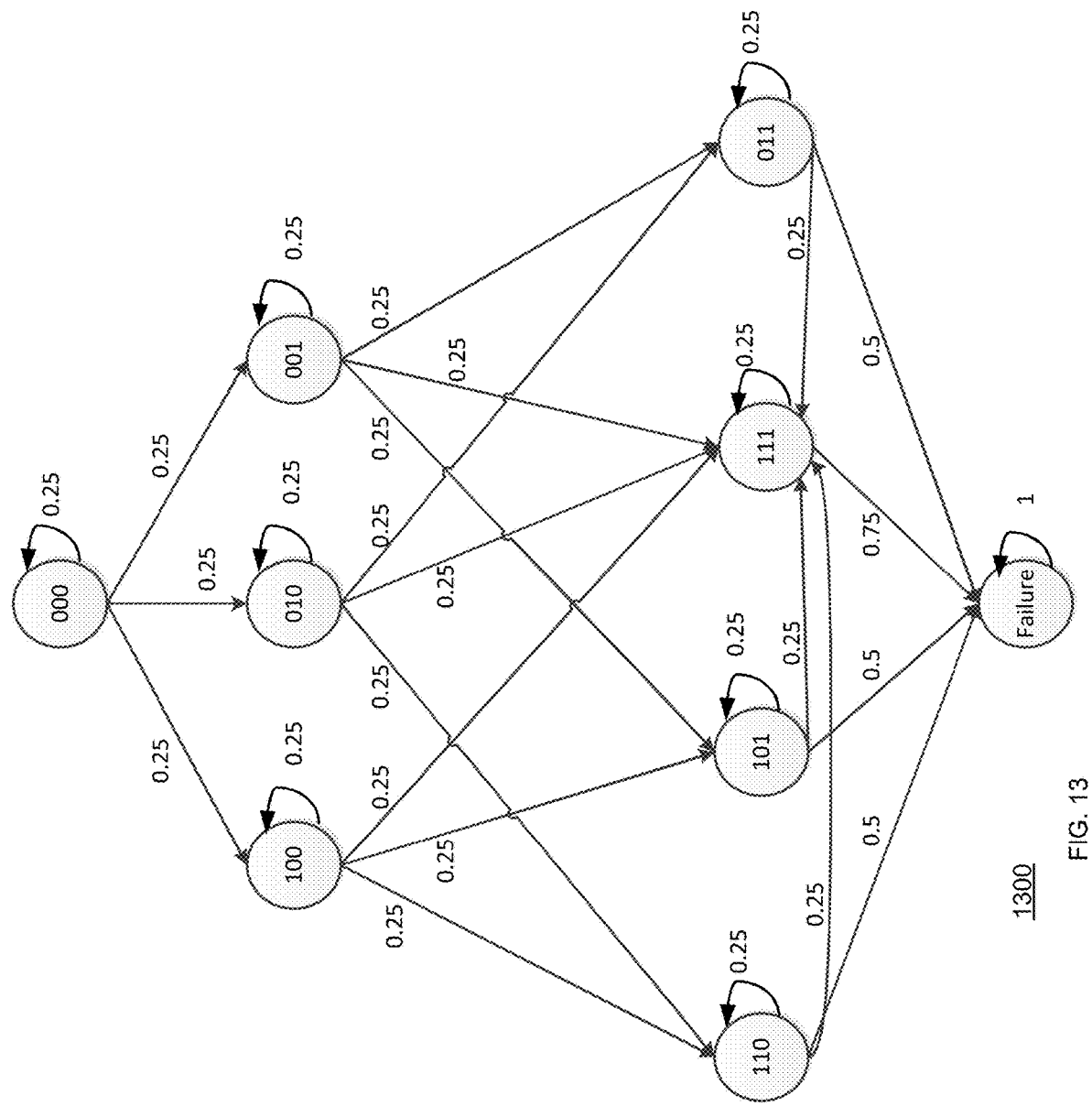
FIGS. 13, 15, 16 and 18 illustrate various curves and graphs according to various embodiments of the invention.

FIG. 12 illustrates graph 1200 that is indicative of these mentioned above probabilities.

Analysis of Segmented-inversion

While using inversion to maximize the zeros at the first write phase (until all empty pages were filled), and minimize the zeros at the second write phase (write over pages of the first phase), the probabilities for Zs and Zi zeros in a page in each phase are:

$$Pr(Z_S = x_1) = \begin{cases} 0 & 0 \leq x_1 < \dfrac{\alpha}{2} \\ \binom{\alpha}{x_1}\dfrac{1}{2^{\alpha-1}} & \dfrac{\alpha}{2} \leq x_1 \leq \alpha \end{cases}$$

$$Pr(Z_I = x_2) = \begin{cases} \binom{\alpha}{x_2}\dfrac{1}{2^{\alpha-1}} & 0 \leq x_2 \leq \dfrac{\alpha}{2} \\ 0 & \dfrac{\alpha}{2} < x_2 \leq \alpha \end{cases}$$

The overwrite probability of segmented-inversion ($P_{SI-OW}$) when choosing randomly a page at each write phase is:

$$P_{SI-OW}(Z_S, Z_I) = \sum_{x_1=\frac{\alpha}{2}}^{\alpha} \sum_{x_2=0}^{\frac{\alpha}{2}} P_1(Z_S = x_1) P_2(Z_I = x_2) P_{OW}(Z_S = x_1, Z_I = x_2)$$

In the case of two inversion bits, page is divided to two chunks. The corresponding write phase's probabilities are:

$$Pr(Z_S = x_1) = \begin{cases} 0 & 0 \leq x_1 < \frac{\alpha}{2} \\ \sum_{\substack{c_1, c_2 \\ c_1+c_2=x_1}} \binom{\alpha}{c_1}\binom{\alpha}{c_2} \frac{1}{2^{2\alpha-2}} & \frac{\alpha}{2} \leq x_1 \leq \alpha \end{cases}$$

$$Pr(Z_I = x_2) = \begin{cases} \sum_{\substack{c_1, c_2 \\ c_1+c_2=x_2}} \binom{\alpha}{c_1}\binom{\alpha}{c_2} \frac{1}{2^{2\alpha-2}} & 0 \leq x_2 < \frac{\alpha}{2} \\ 0 & \frac{\alpha}{2} \leq x_2 \leq \alpha \end{cases}$$

The overwrite probability of segmented-inversion ($P_{SI-OW}$) remains as is.

Generally, for m inversion bits:

$$Pr(Z_S = x_1) = \begin{cases} 0 & 0 \leq x_1 < \frac{\alpha}{2} \\ \sum_{\substack{c_1, c_2, \ldots, c_m \\ c_1+c_2+\ldots+c_m=x_1}} \frac{1}{2^{m(\alpha-1)}} \prod_{i=1}^{m} \binom{\alpha}{c_i} & \frac{\alpha}{2} \leq x_1 \leq \alpha \end{cases}$$

$$Pr(Z_I = x_2) = \begin{cases} \sum_{\substack{c_1, c_2, \ldots, c_m \\ c_1+c_2+\ldots+c_m=x_2}} \frac{1}{2^{m(\alpha-1)}} \prod_{i=1}^{m} \binom{\alpha}{c_i} & 0 \leq x_2 \leq \frac{\alpha}{2} \\ 0 & \frac{\alpha}{2} < x_2 \leq \alpha \end{cases}$$

RAM-assisted WOM Codes

In WOM codes, data is encoded for endurance enhancement and stored in endurance-limited memory cells. We observe that RAM cells, where meta-data is stored, can be also used to store part of the encoded data. The properties of such codes, and specifically write capacity, would be better than conventional ones since endurance-unlimited cells can be used as endurance limited, but not vice-versa.

In the context of segmented-inversion codes, endurance-unlimited cells fit to store the inversion bits. Storing the inversion bits in RAM cells would save their multiplications and thus reduce the required redundancy.

Markovian Analysis of RPU

Figure 14:
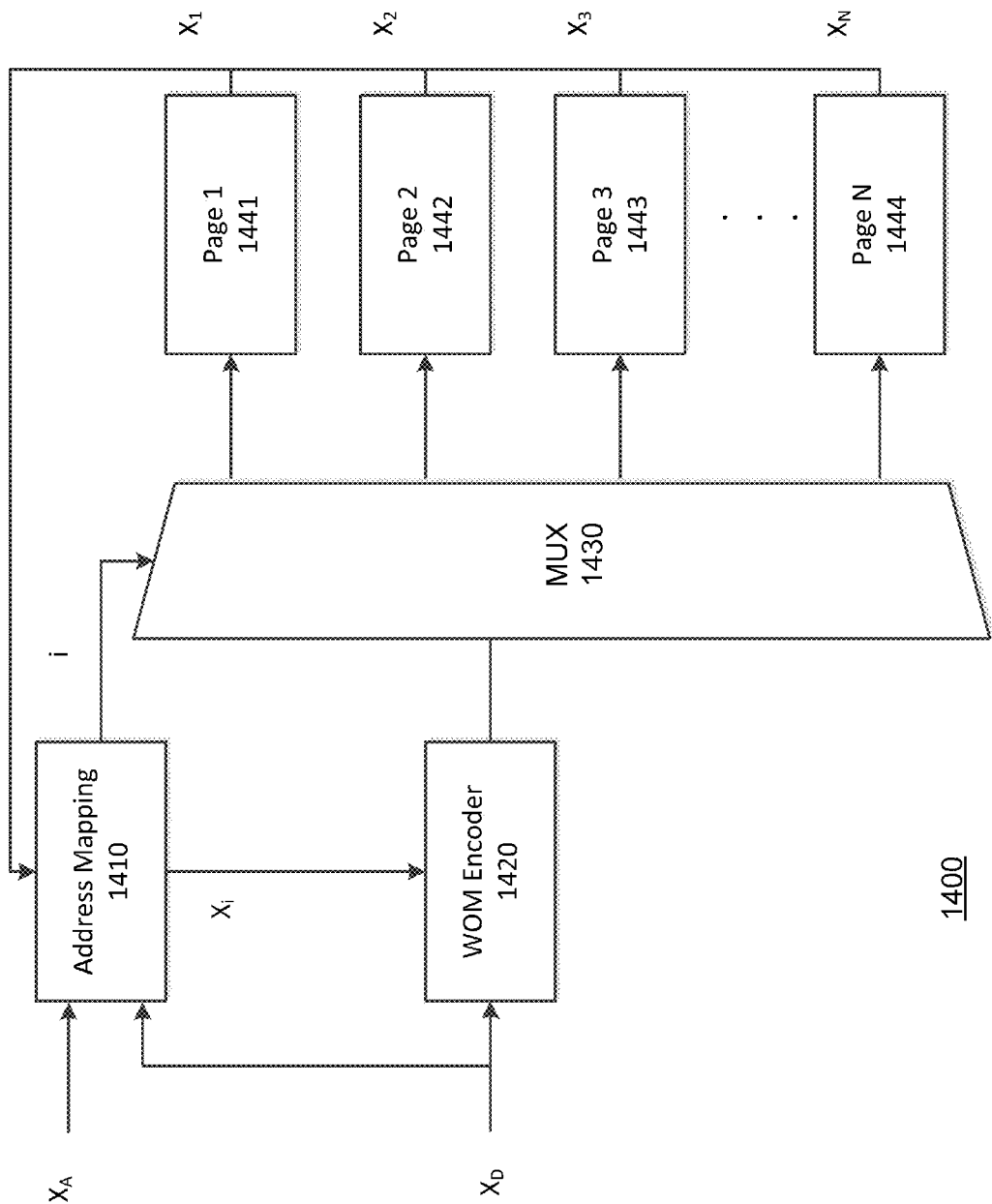

As depicted in FIG. 14 RPU employs any desirable (intra-page) WOM encoder. It decides where to write a data page based on the data to be stored, on the encoder, on the state of its current physical target page and on that of every page in the RPP, as well as on the particular RPU policy in use. Whenever the target physical page is changed, the (already existing) page mapping table is updated accordingly. During read, the table is used to locate the desired page, which is then read and decoded using the WOM decoder. RPU 1400 has inputs Xa and Xp that are fed to address mapping 1410. WOM encoder receives the output signal Xi of address mapping 1040 and Xd and provides an output signal to input of multiplexer (MUX) 1430. The address mapping 1410 controls (i) the selected output of multiplexer 1430 that may output the output signal of WOM encoder to either one of pages 1-N 1441-1444 to provide output signals X1-XN that are fed back to address mapping 1010.

We now consider a specific RPU policy and uniform i.i.d. data. For simplicity, we furthermore consider the case of a single data page and multiple physical pages. The data page is (over)written in place until failure. Then, writing continues in a blank page until failure. Similarly, the process continues until all RPP pages have failed once. The process then continues in a round-robin fashion, moving to the next page upon failure. The scheme reaches Failure state when the data can't be written anywhere.

In order to give a full description of write-once memory with m physical pages and WOM codes with Markov chain of q states, a new Markov chain with $q^m$ states has to be synthesized. However, for deriving the probabilistic write capacity, we are able to reduce the state space.

Lemma 1: The CDF of the number of successful writes of uniform i.i.d data pages with the aforementioned policy can be calculated from two Markov chains: the original q-state and one additional $$\binom{m+l-1}{m}$$

states chain, where l is the number of states in the (single-page) WOM code that have edges to its failure state.

Proof: according to the write policy, the memory is first filled with data until all addresses had one write failure and was thus in one of the l aforementioned states. The number of writes in each page is calculated according to single-address WOM, independently of page order. Therefore, a full description of the memory can be given by choosing m values out of l, with return and without order importance, which is $$\binom{m+l-1}{m}$$

states. Each maw is a distinguishable joint selection of m pages, each of which holds one of l values.

We refer the Markov chain with $$\binom{m+l-1}{m}$$

states as spatial WOM spreading near-failure Markov chain.

Lemma 2: The expected number of writes in spatial spreading of q-states WOM code and m physical pages is:

$$m \sum_{t=1}^{\infty} [1 - (P_0 M^t)_q] + E_{NF}$$

Where $E_{NF}$ is the expected number of writes of near-failure Markov chain, as derived in algorithm 1.

Proof: First, each page is written to until first failure. The mean number of writes per address is:

$$E(X) = \sum_{t=1}^{\infty} Pr(X \geq t) = \sum_{t=1}^{\infty} [1 - Pr(X < t)] = \sum_{t=1}^{\infty} [1 - (P_0 M^t)_q]$$

Where $P_0$ is the q-dimension vector:

$$P_0 = (1\ 0\ 0\ \ldots\ 0)$$

and $(P_0 M^t)_q$, denotes the value at index q of the vector $P_0 M^t$.

Next, the mean number of writes from near-failure Markov chain has is calculated. It depends on the specific memory state, after all other addresses had a write failure.

We define q-dimension $P_t$ vector:

$$P_t = (d_1\ d_2\ d_3\ \ldots\ d_q)$$

Where $d_i$, $1 \leq i \leq q$ corresponds to the probability of a page to be able to store data $d_i$ after t-1 write requests, given that it failed to write at request number t:

$$d_i = P(S_{t-1} = d_i | S_t = \text{fail})$$

According to Bayes rule:

$$P(S_{t-1} = d_i | S_t = \text{fail}) = \frac{P(S_t = \text{fail} | S_{t-1} = d_i) P(S_{t-1} = d_i)}{P(S_t = \text{fail})}$$

Here, $P(S_t = \text{fail} | S_{t-1} = d_i)$ is the probability on the edge from state $d_i$ to the failure state in the single-page WOM Markov chain, and $$P(S_{t-1} = d_i) = (P_0 M^{t-1})_{d_i}$$

$$P(S_t = \text{fail}) = (P_0 M^t)_q$$

Having $P_t$, we can set the initial distribution for the near-failure Markov chain. Each state is composed of a sequence of page states. We refer the vector $P_{NF}$ as the initial probability distribution of near-failure Markov chain. Each index in this vector is the product of the corresponding state probabilities at the vectors $P_{t1}, P_{t2}, \ldots, P_{tm}$.

The expected number of writes is the sum of all normalized possible conditions. The calculation is given in algorithm 1.

---

Algorithm 1: $E_{NF}$ Calculation

Input: $t_G$—the guaranteed number of writes for single page single-page WOM Markov chain
m—number of pages in RPP
$P_{NF}$—state multiplication factors from 1 near-failure states of single-page
WOM Markov chain.
Set $t = m(t_G + 1)$, $E_{NF} = 0$
Calculate all $P_{NF}$ vectors according to any $t_1, t_2, \ldots, t_m$ such that $t_1 + t_2 + \ldots + t_m = t$
For each initial $P_{NF}$ vector conditions, update $E_{NF}$ $$E_{NF} = E_{NF} + \sum_{t_{NF}=1}^{\infty} [1 - (P_{NF} M^{t_{NF}})_q]$$

Update $t = t+1$ and return to 2.

---

Remark: although the summation is infinite, the terms decline rapidly so it may be truncated.

Figure 15:
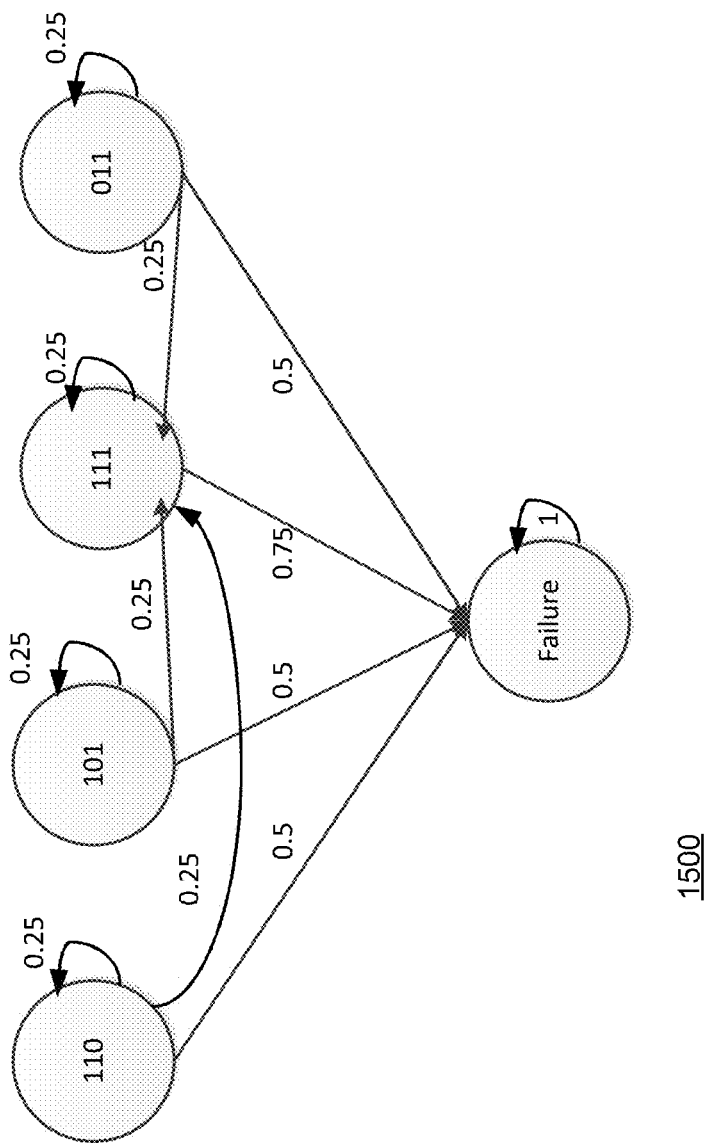
Figure 16:
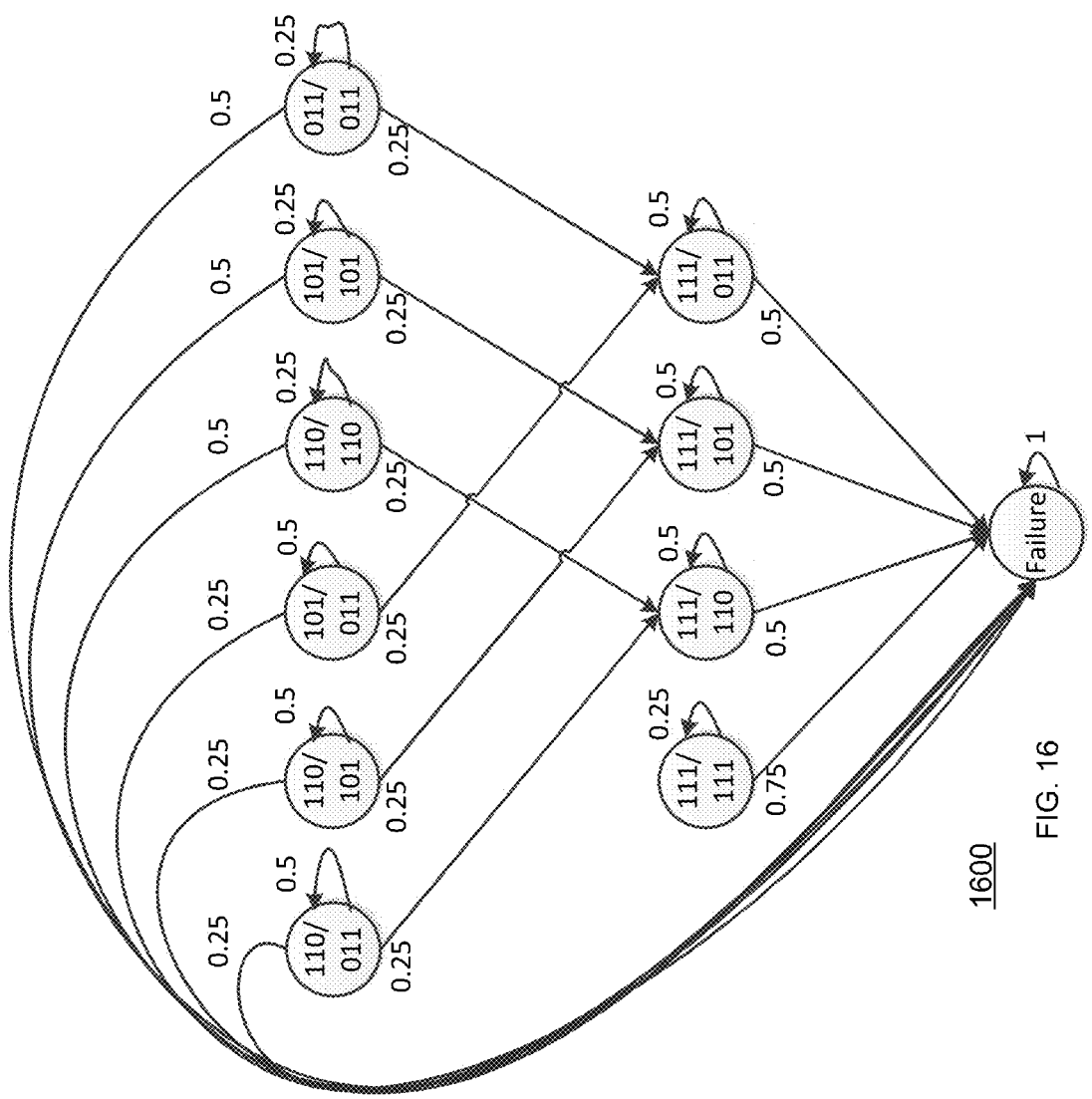

Example 1. We now consider the aforementioned RPU policy in conjunction with the Rivest and Shamir WOM, writing of 2 bits twice on 3 cells on m=2 two distinct addresses ("pages"). The l=4 states of the single-address Markov chain that have an edge to the failure state are shown in FIG. 15. The near-failure Markov chain consists of $$\binom{m+l-1}{m} = \binom{2+4-1}{2} = 10$$

states and is shown in FIG. 16. The Markov transition matrix has a regular order. The expected number of writes is 2·3.29+0.76=7.34 writes, 11.5% greater than the number of writes to two addresses without RPU, namely 2·3.29=6.58.

Figure 17:
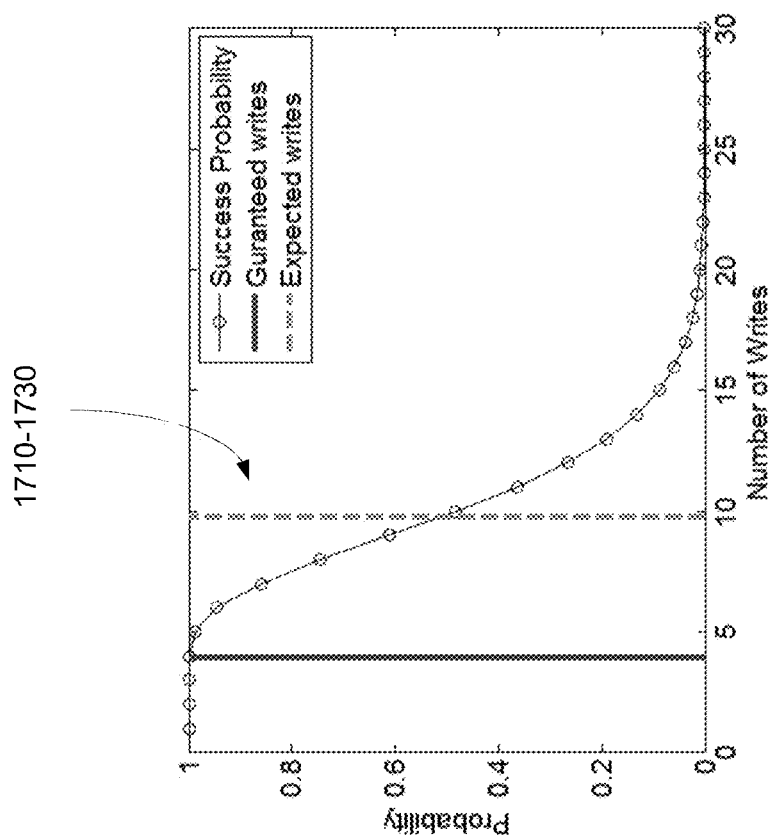
Figure 18:
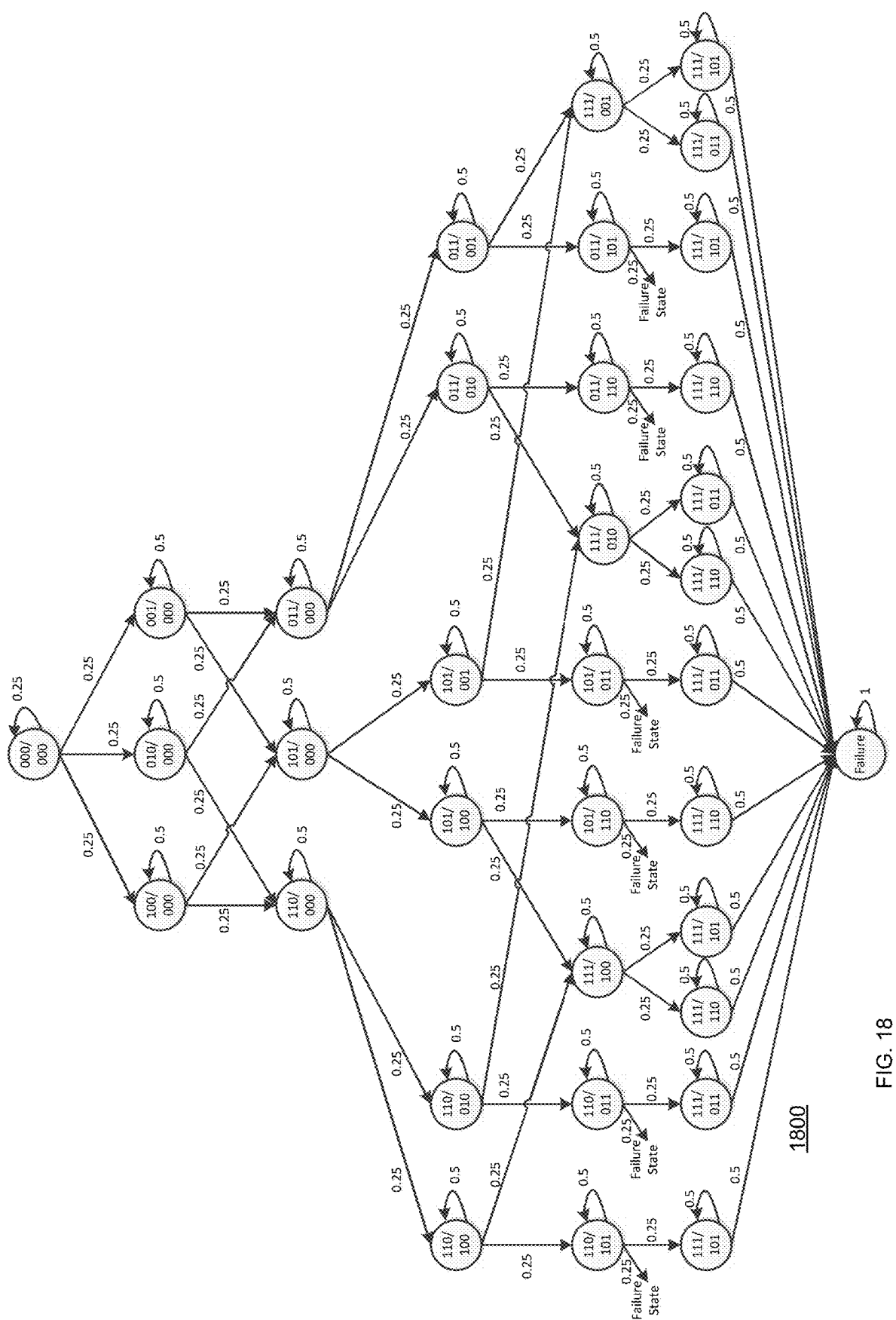

Example 2. Consider again the Rivest and Shamir scheme (FIG. 9), but for a different RPU policy. Consider the case of two addresses. First, data is written the guaranteed number of times to the first address. Next, same is performed for the second address. Next, write is attempted to the first address, and if fails to the second. The whole scheme fails when data cannot be updated on either one of the addresses. The full Markov chain of the described policy is shown in FIG. 18. The expected number of writes for this scheme is 9.833, as compared to expected 6.58 without RPU, a 50% increase. The CDF of this two-address scheme is shown in FIG. 17.

Remark: The above examples used a simple WOM code and tiny pages for illustration purposes. The numerical results are therefore not indicative of the achievable improvement for common page sizes using other WOM codes.

FIG. 19 illustrates method 2000 according to an embodiment of the invention.

Method 2000 may start by stage 2010 of finding that an encoded data unit of a first value cannot be written to a first group of flash memory cells without erasing an erase block that includes the first group of flash memory cells.

The encoded data unit can be encoded by using an encoding scheme that is limited to representing a value by a single manner or by an encoding scheme that allows representing a same value in different manners.

Stage 2010 may be followed by stage 2020 of searching for a retired group of flash memory cells that can store a representation of the data unit without being erased.

Stage 2020 can include generating the representation of the data unit or determining one or more manners to represent the data unit. The representation can be an encoded form of the data unit wherein the encoded form can be generated by applying a one to multiple encoding scheme that allows a certain value to be represented in multiple manners.

The first group of flash memory cells may form a page of flash memory cells, a portion of a page or more than a page.

The selected retired group of flash memory cells may form a portion of a retired page of flash memory cells, a retired page or more than one retired page.

The searching can be done on a pool of retired groups of flash memory cells or on a subset of the pool. The subset can be generated based upon a number of writable without erasure flash memory cells within each group of flash memory cells The searching can include searching a selected group of flash memory cells out of multiple groups of flash memory cells.

The searching can include determining candidates, and applying any of the considerations mentioned in the specification. It may include at least one out of:

a. Searching the selected retired group of flash memory cells out of a multiple groups of flash memory cells of a pool of retired flash memory cells.
b. Selecting the selected retired group of flash memory cells out of multiple groups of flash memory cells of the pool of retired flash memory cells in response to a number of writable without erasure flash memory cells per each group of flash memory cells.
c. Selecting the selected group of flash memory as having a lowest number of writable without erasure flash memory cells out of the multiple groups of flash memory cells.
d. Selecting the selected group of flash memory cells in response to a program and erase cycle count of each of the multiple groups of flash memory cells.
e. Selecting the selected group of flash memory cells as having a lowest number of program and erase cycle count of each of the multiple groups of flash memory cells.
f. Selecting the selected group of flash memory cells based upon a number of flash memory cells that should be programmed, per each group of flash memory cells, for storing the representation of the data unit.
g. Selecting the selected group of flash memory cells that requires a lowest number of flash memory cells to be programmed for storing the representation of the data unit.
h. Selecting the selected group of flash memory cells in response to (a) a number of flash memory cells that should be programmed, per each group of flash memory cells, for storing the representation of the data unit, and (b) number of writable without erasure flash memory cells of each of the multiple groups of flash memory cells.
i. Applying different selection policies to select the selected group of flash memory cells in response to a state of the multiple flash memory cells.
j. Selecting the selected group of flash memory cells to be of (a) a highest number of writable without erasure flash memory cells out of the multiple groups of flash memory cells, and (b) is capable of storing the representation of the data unit without being erased.

Stage 2020 may be followed by stage 2030 of writing the representation of the data unit to the selected retired group of flash memory cells.

Stage 2030 may include determining a manner of writing the representation to the selected group of flash memory cells in response to a fullness level of the selected group of flash memory cells. The distribution between "00" and "1" values flash memory cells may determine whether to write the representation or a complementary version of the representation Stage 2030 may be followed by stage 2040 of allocating the first group of flash memory cells to a pool of retired flash memory cell groups or determining to erase the erase block that includes the first group of flash memory cells.

Figure 11:
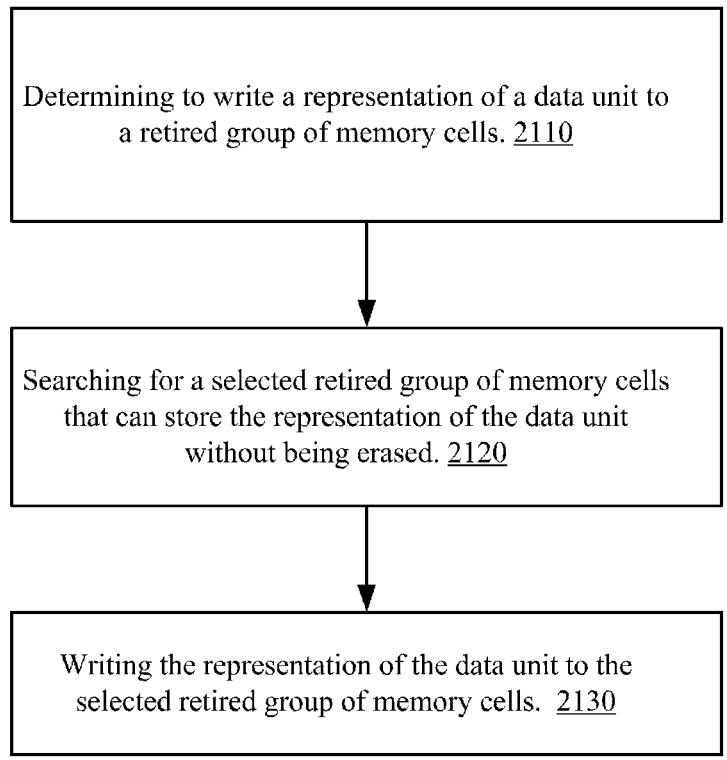
FIG. 11 illustrates a method, according to an embodiment of the invention.

FIG. 11 illustrates method 2100 according to an embodiment of the invention.

Method 2100 starts by stage 2010 of determining to write a representation of a data unit to a retired group of memory cells. Stage 2010 may include selecting between writing the representation to a retired group of memory cells or not (for example—to an erased group of memory cells, to a group of memory cells that are not erased and are not retired).

Stage 2010 is followed, if it is determined to write to a retired group of memory cells, by stage 2020 of searching for a selected retired group of memory cells that can store a representation of the data unit without being erased.

Stage 2020 is followed by stage 2030 of writing the representation of the data unit to the selected retired group of memory cells.

It is noted that the method can be updated and that instead of writing the representation to a retired page the method may include determining to write the representation to an erased page.

The invention may also be implemented in a computer program for running on a computer system, at least including code portions for performing steps of a method according to the invention when run on a programmable apparatus, such as a computer system or enabling a programmable apparatus to perform functions of a device or system according to the invention. A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method for writing data to a memory module, the method comprises:
   determining to write a representation of a data unit to a retired group of memory cells; wherein the retired group of memory cells are capable of storing a certain value only after being erased, but are capable of storing certain other values without being erased;
   searching for a selected retired group of memory cells that can store a representation of the data unit without being erased; and
   writing the representation of the data unit to the selected retired group of memory cells.

2. The method according to claim 1, wherein the determining is preceded by finding that an encoded data unit of a first value cannot be written to a first group of memory cells without erasing an erase block that comprises the first group of memory cells.

3. The method according to claim 1 wherein the determining comprises determining whether to write the representation of the data unit to an erased group of memory cells or to the retired group of memory cells.

4. The method according to claim 1, comprising generating a representation of the data unit by applying an encoding scheme that allows representing a same value in different manners and considering at least one of the manners when evaluating a candidate group of cells.

5. The method according to claim 4, wherein the encoding scheme is a write-once memory scheme.

6. The method according to claim 2, wherein the encoded data unit of the first value is encoded by using an encoding scheme that is limited to representing a value by a single manner.

7. The method according to claim 1, wherein the determining is preceded by finding that writing an encoded data unit of a first value to a first group of memory cells is more costly than writing the representation of the data unit to the selected group of memory cells.

8. The method according to claim 1, wherein the first group of memory cells forms a page of memory cells.

9. The method according to claim 1, wherein the selected retired group of memory cells is a portion of a retired page of memory cells.

10. The method according to claim 1, comprising allocating the first group of memory cells to a pool of retired memory cell groups.

11. The method according to claim 1, comprising searching the selected retired group of memory cells out of multiple groups of memory cells of a pool of retired memory cells.

12. The method according to claim 11, wherein the multiple groups of memory cells form a subset of the pool of the retired memory cells.

13. The method according to claim 11, wherein the multiple groups of memory cells form a subset of the pool of the retired memory cells, wherein the subset is generated based upon a number of writable without erasure memory cells within each group of memory cells.

14. The method according to claim 11, comprising selecting the selected retired group of memory cells out of multiple groups of memory cells of the pool of retired memory cells in response to a number of writable without erasure memory cells per each group of memory cells.

15. The method according to claim 11, comprising selecting the selected group of memory cell out of groups of memory cell capable of storing the representation of the data unit without being erased as having a lowest number of writable without erasure memory cells.

16. The method according to claim 11, comprising selecting the selected group of memory cells to be of (a) a smallest number of memory cells that need to be written into out of the multiple groups of memory cells, and (b) is capable of storing the representation of the data unit without being erased.

17. The method according to claim 11, comprising selecting the selected group of memory cells in response to a program and erase cycle count of each of the multiple groups of memory cells.

18. The method according to claim 11, comprising selecting the selected group of memory cells as having a lowest number of program and erase cycle count of each of the multiple groups of memory cells.

19. The method according to claim 1 wherein the retired group of memory cells are single level cells.

20. A non-transitory computer readable medium that stores instructions for determining to write a representation of a data unit to a retired group of memory cells; wherein the retired group of memory cells are capable of storing a certain value only after being erased, but are capable of storing certain other values without being erased; searching for a selected retired group of memory cells that can store a representation of the data unit without being erased; and writing the representation of the data unit to the selected retired group of memory cells.

21. A system comprising a memory controller that is arranged to determine to write a representation of a data unit to a retired group of memory cells; wherein the retired group of memory cells are capable of storing a certain value only after being erased, but are capable of storing certain other values without being erased; search for a selected retired group of memory cells that can store a representation of the data unit without being erased; and write the representation of the data unit to the selected retired group of memory cells.

* * * * *